US012696255B2

(12) United States Patent
Hosseini et al.

(10) Patent No.: US 12,696,255 B2
(45) Date of Patent: Jul. 28, 2026

(54) PHYSICAL SHARED CHANNEL DESIGN FOR FLEXIBLE SPECTRUM INTEGRATION

(71) Applicant: QUALCOMM Incorporated, San Diego, CA (US)

(72) Inventors: Kianoush Hosseini, San Diego, CA (US); Mostafa Khoshnevisan, San Diego, CA (US); Alberto Rico Alvarino, San Diego, CA (US); Jae Won Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/608,039

(22) Filed: Mar. 18, 2024

(65) Prior Publication Data

US 2025/0294536 A1     Sep. 18, 2025

(51) Int. Cl.
*H04W 72/0453*      (2023.01)
*H04L 1/00*      (2006.01)
*H04L 5/00*      (2006.01)
*H04W 72/1273*      (2023.01)

(52) U.S. Cl.
CPC ....... *H04W 72/0453* (2013.01); *H04L 1/0071* (2013.01); *H04L 5/0094* (2013.01); *H04W 72/1273* (2013.01)

(58) Field of Classification Search
CPC .......... H04W 72/0453; H04W 72/1273; H04L 1/0071; H04L 5/0094; H04L 5/001; H04L 5/0044; H04L 5/0053
See application file for complete search history.

(56) References Cited

U.S. PATENT DOCUMENTS

| 2017/0134109 | A1* | 5/2017 | Hwang | .................. H04L 1/009 |
| 2019/0349130 | A1* | 11/2019 | Khoshnevisan | ...... H04L 1/0009 |
| 2021/0051572 | A1* | 2/2021 | Roy | ...................... H04L 5/0094 |

* cited by examiner

*Primary Examiner* — Chae S Lee
(74) *Attorney, Agent, or Firm* — QUALCOMM Incorporated

(57) ABSTRACT

Methods, systems, and devices for wireless communications are described. A transmitting device may obtain an indication of information for an integrated spectrum channel of a single virtual cell, the integrated spectrum channel comprising a set of subbands that are formed by combining frequency resources from multiple frequency bands. The transmitting device may obtain a grant scheduling communications with a receiving wireless device in the integrated spectrum channel. The transmitting device may generate a single transport block corresponding to a transmission of data over the set of subbands of the integrated spectrum channel. The transmitting device may transmit the single transport block to the receiving wireless device in the integrated spectrum channel according to the grant.

30 Claims, 17 Drawing Sheets

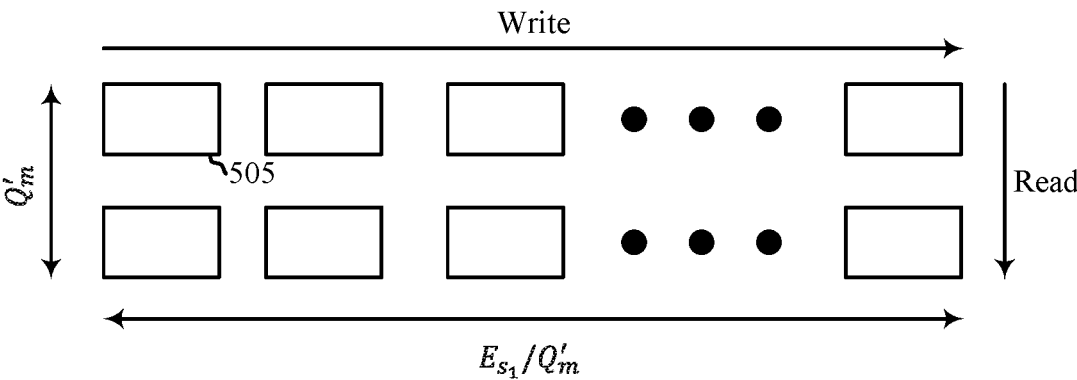
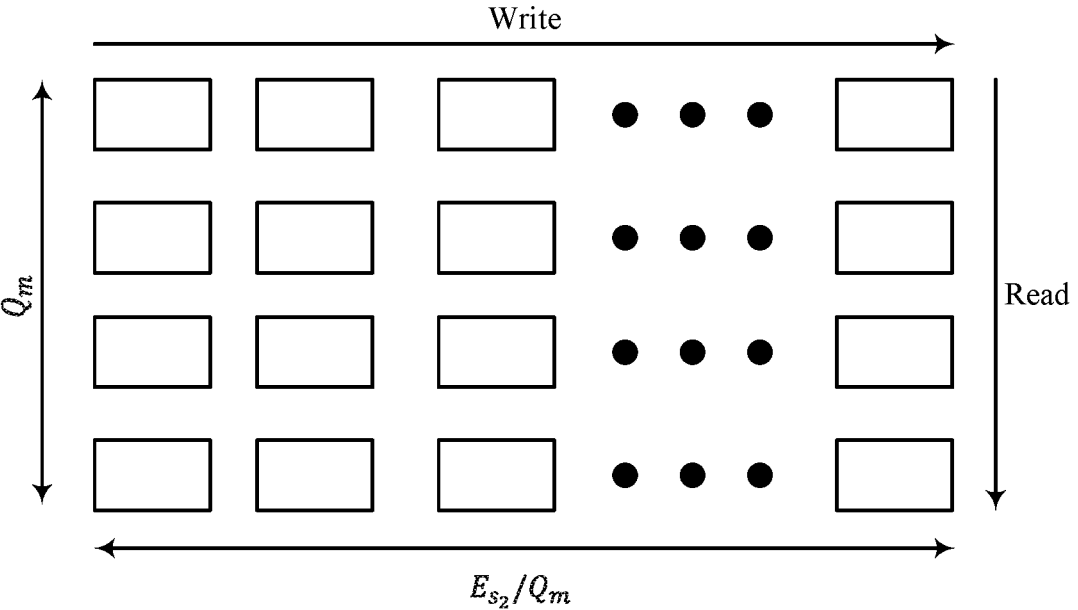
FIG. 5

130

105

115

Network Entity

Transceiver

1210

Antenna

1215

Communications Manager

1220

Memory

Code

1230

1225

1240

Processor

1235

1205

1200

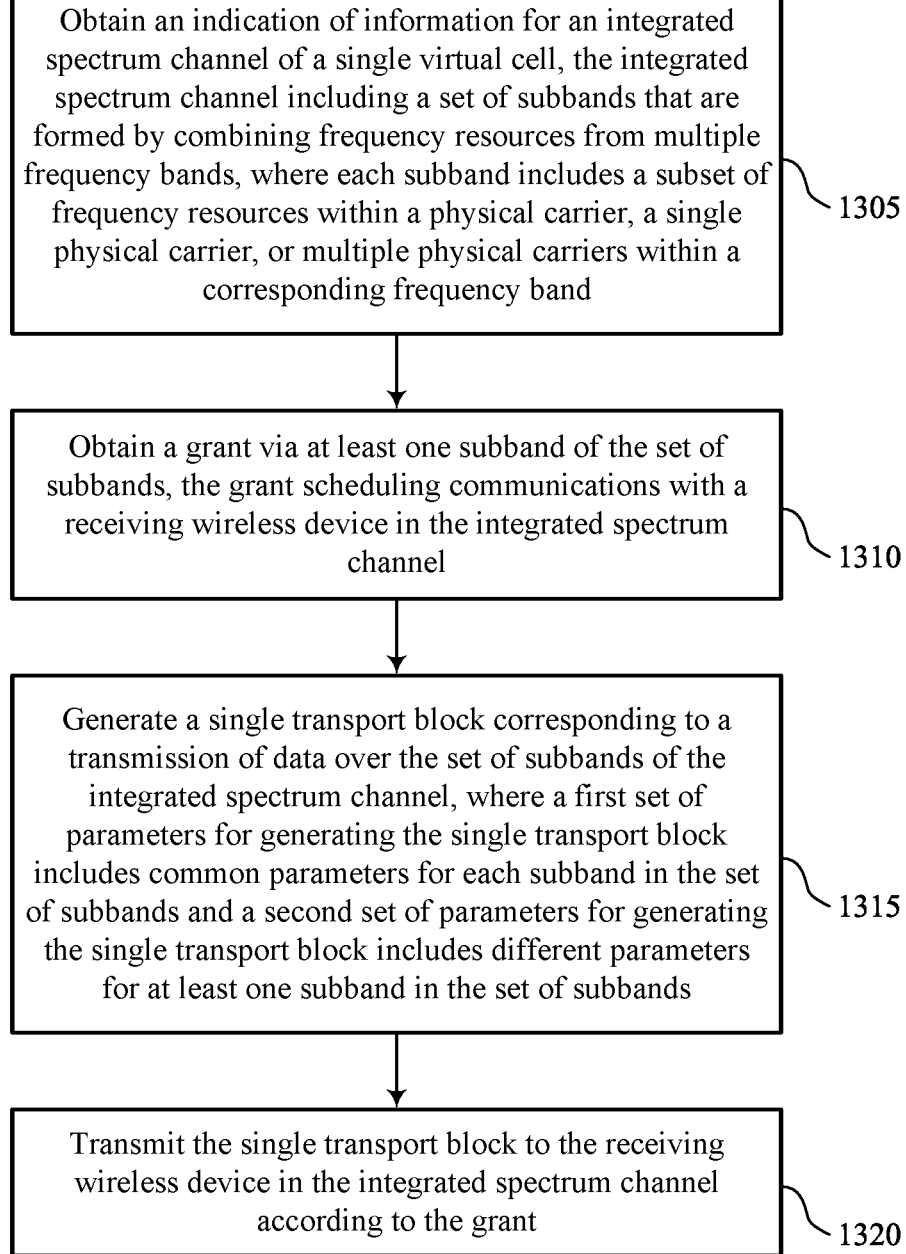

Obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band

1305

Obtain a grant via at least one subband of the set of subbands, the grant scheduling communications with a receiving wireless device in the integrated spectrum channel

1310

Generate a single transport block corresponding to a transmission of data over the set of subbands of the integrated spectrum channel, where a first set of parameters for generating the single transport block includes common parameters for each subband in the set of subbands and a second set of parameters for generating the single transport block includes different parameters for at least one subband in the set of subbands

1315

Transmit the single transport block to the receiving wireless device in the integrated spectrum channel according to the grant

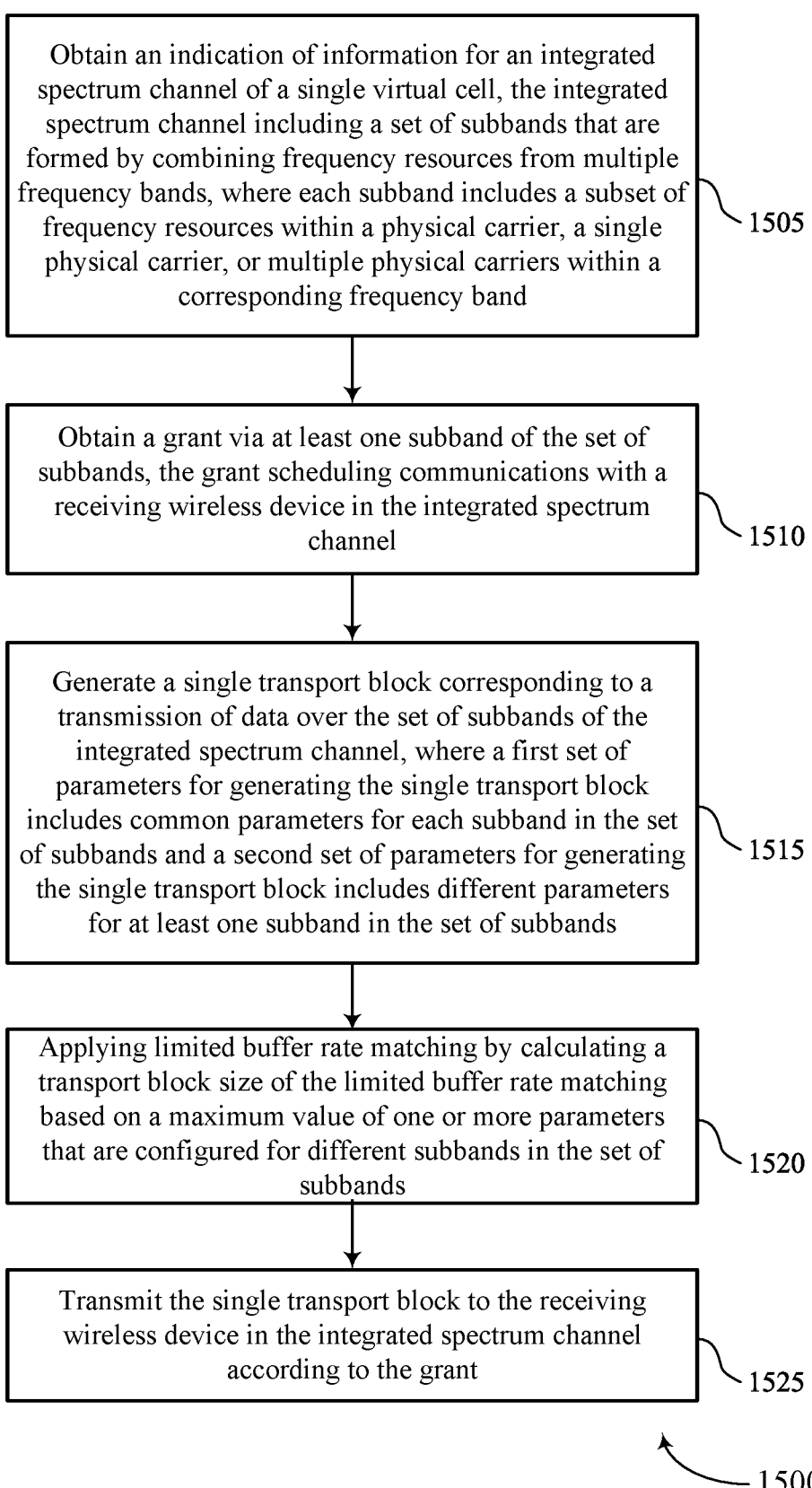

Obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band

1505

Obtain a grant via at least one subband of the set of subbands, the grant scheduling communications with a receiving wireless device in the integrated spectrum channel

1510

Generate a single transport block corresponding to a transmission of data over the set of subbands of the integrated spectrum channel, where a first set of parameters for generating the single transport block includes common parameters for each subband in the set of subbands and a second set of parameters for generating the single transport block includes different parameters for at least one subband in the set of subbands

1515

Applying limited buffer rate matching by calculating a transport block size of the limited buffer rate matching based on a maximum value of one or more parameters that are configured for different subbands in the set of subbands

1520

Transmit the single transport block to the receiving wireless device in the integrated spectrum channel according to the grant

Figure 16:
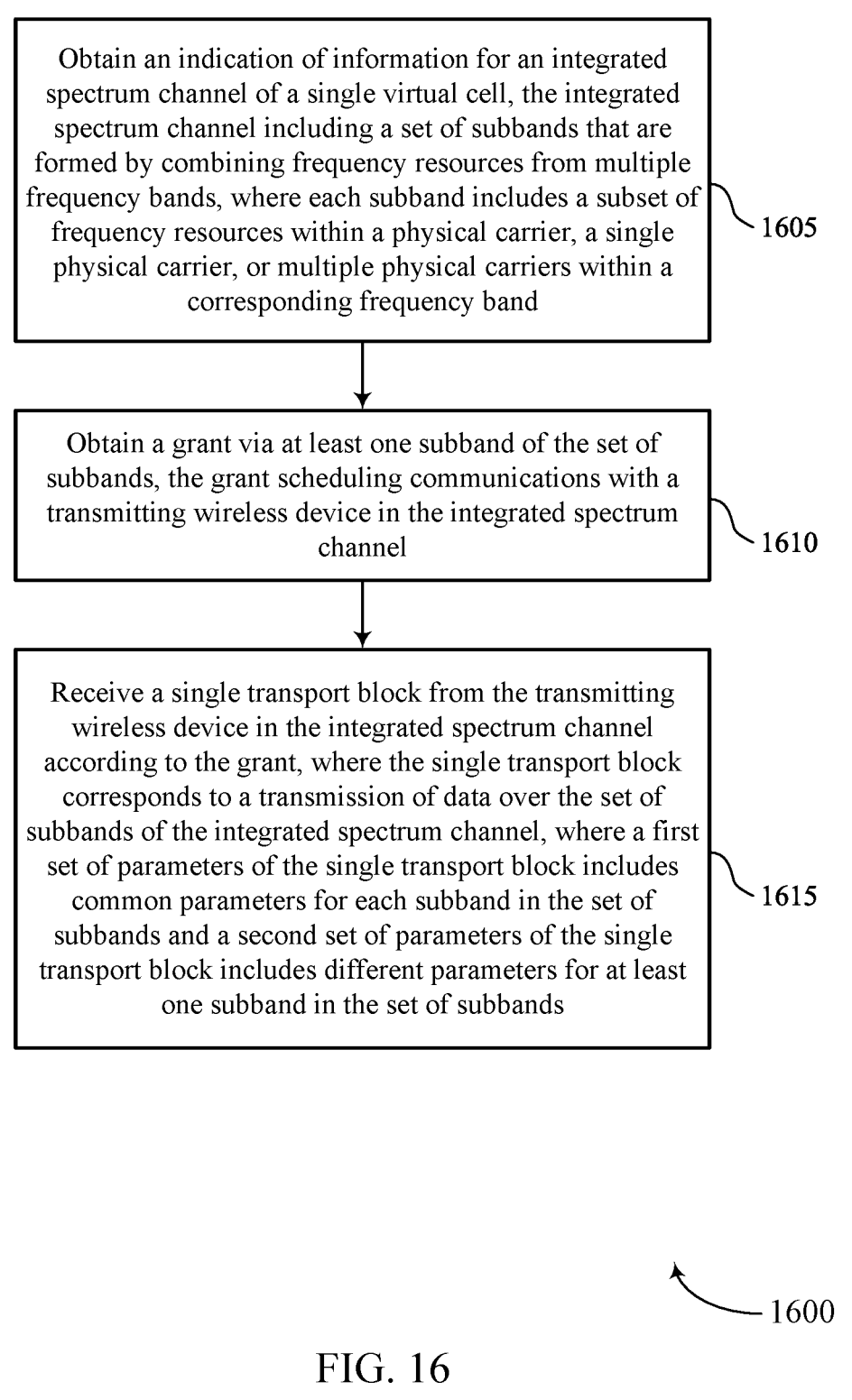

Obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band

1605

Obtain a grant via at least one subband of the set of subbands, the grant scheduling communications with a transmitting wireless device in the integrated spectrum channel

1610

Receive a single transport block from the transmitting wireless device in the integrated spectrum channel according to the grant, where the single transport block corresponds to a transmission of data over the set of subbands of the integrated spectrum channel, where a first set of parameters of the single transport block includes common parameters for each subband in the set of subbands and a second set of parameters of the single transport block includes different parameters for at least one subband in the set of subbands

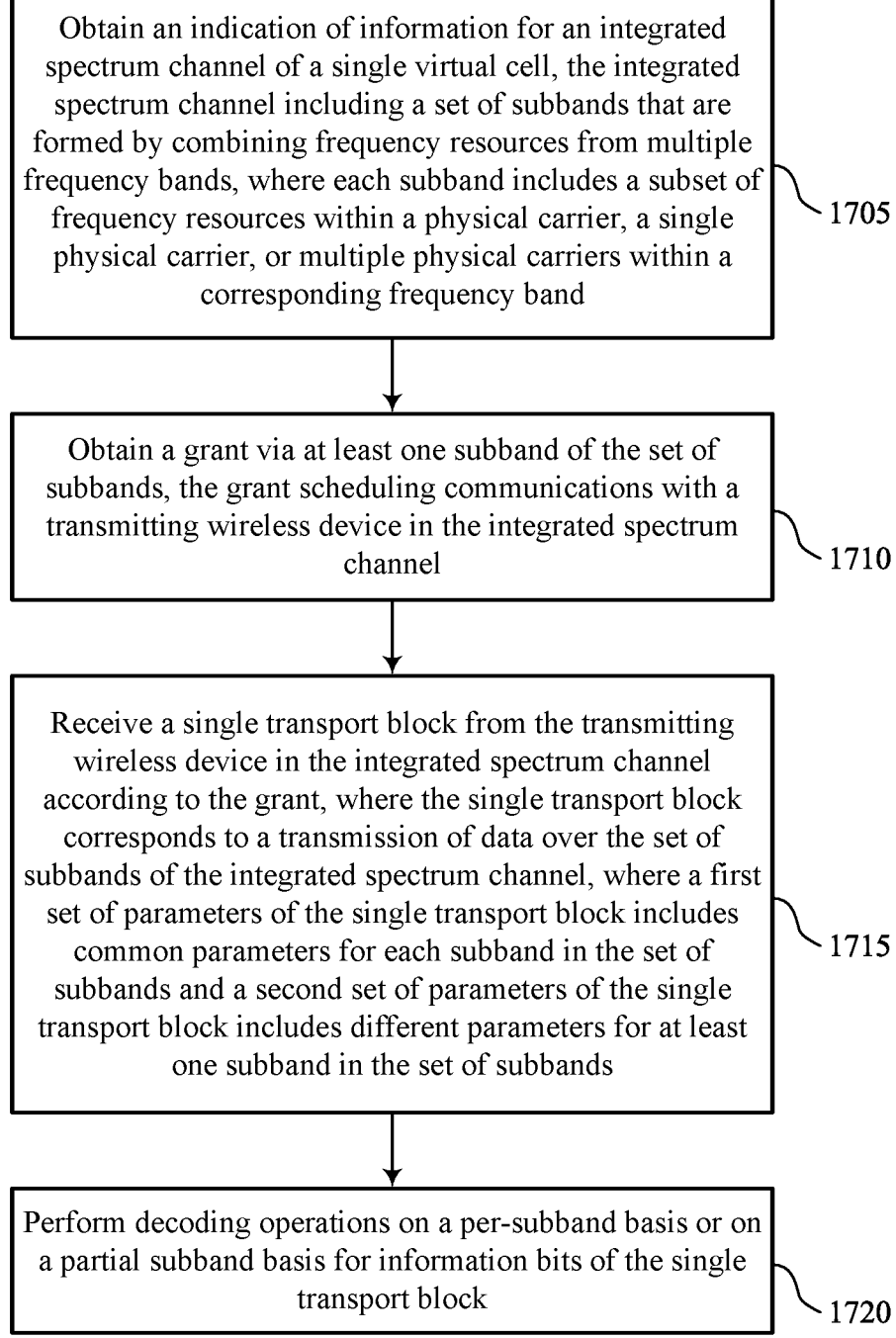

Obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band

1705

Obtain a grant via at least one subband of the set of subbands, the grant scheduling communications with a transmitting wireless device in the integrated spectrum channel

1710

Receive a single transport block from the transmitting wireless device in the integrated spectrum channel according to the grant, where the single transport block corresponds to a transmission of data over the set of subbands of the integrated spectrum channel, where a first set of parameters of the single transport block includes common parameters for each subband in the set of subbands and a second set of parameters of the single transport block includes different parameters for at least one subband in the set of subbands

1715

Perform decoding operations on a per-subband basis or on a partial subband basis for information bits of the single transport block

PHYSICAL SHARED CHANNEL DESIGN FOR FLEXIBLE SPECTRUM INTEGRATION

FIELD OF TECHNOLOGY

The following relates to wireless communications, including physical shared channel design for flexible spectrum integration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support physical shared channel design for flexible spectrum integration. For example, the described techniques provide various examples of techniques that may be applied when a transmitting device and a receiving device are communicating via a single virtual cell in an integrated spectrum channel. The integrated spectrum channel may be formed by combining frequency resources from multiple frequency bands into subbands. Each subband may generally include a subset of frequency resources within a physical carrier, a single physical carrier, or multiple physical carriers. Accordingly, the transmitting device may obtain or otherwise identify an indication of the integrated spectrum channel of the single virtual cell. The transmitting device may obtain a grant that schedules communications with a receiving wireless device in the subbands of the integrated spectrum channel. The transmitting device may generate a single transport block (TB) for transmitting the data to the receiving wireless device over the subband(s) of the integrated spectrum channel. In some aspects, a first set of parameters used for generating the single TB may be common parameters across the subbands while a second set of parameters may be different parameters between the subbands. The transmitting device may transmit or otherwise output the single TB to the receiving device in the integrated spectrum channel based on the grant.

A method for wireless communications by a transmitting wireless device is described. The method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, obtaining a grant via at least one subband of the set of subbands, the grant scheduling communications with a receiving wireless device in the integrated spectrum channel, generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands, and transmitting the single TB to the receiving wireless device in the integrated spectrum channel according to the grant.

A transmitting wireless device for wireless communications is described. The transmitting wireless device may include one or more memories storing processor executable code, and one or more processors coupled with the one or more memories. The one or more processors may individually or collectively be operable to execute the code to cause the transmitting wireless device to obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, obtain a grant via at least one subband of the set of subbands, the grant scheduling communications with a receiving wireless device in the integrated spectrum channel, generate a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands, and transmit the single TB to the receiving wireless device in the integrated spectrum channel according to the grant.

Another transmitting wireless device for wireless communications is described. The transmitting wireless device may include means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, means for obtaining a grant via at least one subband of the set of subbands, the grant scheduling communications with a receiving wireless device in the integrated spectrum channel, means for generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands, and means for transmitting the single TB to the receiving wireless device in the integrated spectrum channel according to the grant.

A non-transitory computer-readable medium storing code for wireless communications is described. The code may include instructions executable by one or more processors to obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, obtain a grant via at least one subband of the set of subbands, the grant scheduling communications with a receiving wireless device in the integrated spectrum channel, generate a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands, and transmit the single TB to the receiving wireless device in the integrated spectrum channel according to the grant.

In some examples of the method, transmitting wireless devices, and non-transitory computer-readable medium described herein, generating the single TB may include operations, features, means, or instructions for calculating, for each subband in the set of subbands, a first number of resource elements available for the transmission of data within each physical resource block of a corresponding subband.

Some examples of the method, transmitting wireless devices, and non-transitory computer-readable medium described herein may further include operations, features, means, or instructions for calculating a second number of resource elements available for the transmission of data within each subband based on a number of physical resource blocks within the corresponding subband and the first number of resource elements.

Some examples of the method, transmitting wireless devices, and non-transitory computer-readable medium described herein may further include operations, features, means, or instructions for calculating a total number of information bits available for transmission of data for all subbands within the set of subbands based on the first number of resource elements and the second number of resource elements and selecting a TB size for the single TB based on the total number of information bits available for transmission of data.

Some examples of the method, transmitting wireless devices, and non-transitory computer-readable medium described herein may further include operations, features, means, or instructions for applying limited buffer rate matching by calculating a transport block size of the limited buffer rate matching based on a maximum value of one or more parameters that are configured for different subbands in the set of subbands.

In some examples of the method, transmitting wireless devices, and non-transitory computer-readable medium described herein, the grant may be obtained in a physical downlink control channel (PDCCH) control resource set (CORESET) that is limited to a single subband of the set of subbands.

In some examples of the method, transmitting wireless devices, and non-transitory computer-readable medium described herein, the grant may be obtained in a subset of subbands of the set of subbands and the subset of subbands may be based on a capability of the receiving wireless device.

In some examples of the method, transmitting wireless devices, and non-transitory computer-readable medium described herein, generating the single TB may include operations, features, means, or instructions for performing symbol mapping of information bits within each subband in the set of subbands based on a physical carrier within the subband, on a frequency band of the subband, or both.

In some examples of the method, transmitting wireless devices, and non-transitory computer-readable medium described herein, the different parameters of the second set of parameters include a first modulation order and number of layers for a first subset of subbands associated with a first set of link parameters and a second modulation order and number of layers for a second subset of subbands associated with a second set of link parameters.

In some examples of the method, transmitting wireless devices, and non-transitory computer-readable medium described herein, each of one or more codeblocks of the single TB may be mapped to a single subband within the set of subbands or may be mapped across more than one subband within the set of subbands.

In some examples of the method, transmitting wireless devices, and non-transitory computer-readable medium described herein, generating the single TB may include operations, features, means, or instructions for performing precoding operations on a per-subband basis or on a partial subband basis for information bits of the single TB.

In some examples of the method, transmitting wireless devices, and non-transitory computer-readable medium described herein, generating the single TB may include operations, features, means, or instructions for identifying a total bandwidth that a group of codeblocks of the single TB may be mapped to in the set of subbands, where the total bandwidth may be based on a first bandwidth of a first subset of subbands and a second bandwidth of a second subset of subbands.

Some examples of the method, transmitting wireless devices, and non-transitory computer-readable medium described herein may further include operations, features, means, or instructions for mapping a first subset of the group of codeblocks to the first subset of subbands based on the first bandwidth and a second subset of the group of codeblocks to the second subset of subbands based on the second bandwidth.

In some examples of the method, transmitting wireless devices, and non-transitory computer-readable medium described herein, each subset of the group of codeblocks may be mapped exclusively to the corresponding subset of subbands.

Some examples of the method, transmitting wireless devices, and non-transitory computer-readable medium described herein may further include operations, features, means, or instructions for mapping each codeblock of the group of codeblocks to the first subset of subbands or to the second subset of subbands based on the total bandwidth.

In some examples of the method, transmitting wireless devices, and non-transitory computer-readable medium described herein, mapping, based on the total bandwidth, on the first bandwidth, and the second bandwidth, a first subset of the group of codeblocks to the first subset of subbands and a second subset of the group of codeblocks to the second subset of subbands.

In some examples of the method, transmitting wireless devices, and non-transitory computer-readable medium described herein, generating the single TB may include operations, features, means, or instructions for identifying a number of subbands in the set of subbands to map each codeblock of the single TB to based on a capability of the receiving wireless device, on a grant-based timeline, or both.

In some examples of the method, transmitting wireless devices, and non-transitory computer-readable medium described herein, the grant-based timeline includes a first time between obtaining the grant and transmitting the single TB or on a second time between transmitting the single TB and a feedback message transmission associated with transmission of the single TB.

In some examples of the method, transmitting wireless devices, and non-transitory computer-readable medium described herein, each subband in the set of subbands may be associated with a common subcarrier spacing.

In some examples of the method, transmitting wireless devices, and non-transitory computer-readable medium described herein, one or more subbands in the set of subbands may be associated with a different subcarrier spacing.

In some examples of the method, transmitting wireless devices, and non-transitory computer-readable medium described herein, generating the single TB may include operations, features, means, or instructions for mapping each codeblock in the single TB to one or more subbands in the set of subbands that may be associated with a common subcarrier spacing.

In some examples of the method, transmitting wireless devices, and non-transitory computer-readable medium described herein, generating the single TB may include operations, features, means, or instructions for mapping one or more codeblocks in the single TB to a subset of subbands associated with the different subcarrier spacing.

In some examples of the method, transmitting wireless devices, and non-transitory computer-readable medium described herein, a feedback timeline associated with transmitting the single TB may be based on a subband having a smallest subcarrier spacing or a subcarrier spacing associated with an absolute largest processing timeline.

In some examples of the method, transmitting wireless devices, and non-transitory computer-readable medium described herein, the different parameters of the second set of parameters include different modulation orders for different subbands in the set of subbands.

In some examples of the method, transmitting wireless devices, and non-transitory computer-readable medium described herein, generating the single TB may include operations, features, means, or instructions for interleaving, in a uniform systemic bit priority mapper, bits of a first codeblock of the single TB to a first subband associated with a first modulation order and a second codeblock of the single TB to a second subband associated with a second modulation order.

In some examples of the method, transmitting wireless devices, and non-transitory computer-readable medium described herein, generating the single TB may include operations, features, means, or instructions for interleaving, in a non-uniform systemic bit priority mapper, bits of a first codeblock of the single TB and a second codeblock of the single TB to a first subband associated with a first modulation order and to a second subband associated with a second modulation order.

Some examples of the method, transmitting wireless devices, and non-transitory computer-readable medium described herein may further include operations, features, means, or instructions for obtaining an indication of an interleaving parameter for the single TB, where the interleaving parameter may be based on a capability of the receiving wireless device.

In some examples of the method, transmitting wireless devices, and non-transitory computer-readable medium described herein, mapping modulated symbols of the single TB to spatial layers on a per-subband basis.

A method for wireless communications by a receiving wireless device is described. The method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, obtaining a grant via at least one subband of the set of subbands, the grant scheduling communications with a transmitting wireless device in the integrated spectrum channel, and receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

A receiving wireless device for wireless communications is described. The receiving wireless device may include one or more memories storing processor executable code, and one or more processors coupled with the one or more memories. The one or more processors may individually or collectively be operable to execute the code to cause the receiving wireless device to obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, obtain a grant via at least one subband of the set of subbands, the grant scheduling communications with a transmitting wireless device in the integrated spectrum channel, and receive a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

Another receiving wireless device for wireless communications is described. The receiving wireless device may include means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, means for obtaining a grant via at least one subband of the set of subbands, the grant scheduling communications with a transmitting wireless device in the integrated spectrum channel, and means for receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

A non-transitory computer-readable medium storing code for wireless communications is described. The code may include instructions executable by one or more processors to obtain an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band, obtain a grant via at least one subband of the set of subbands, the grant scheduling communications with a transmitting wireless device in the integrated spectrum channel, and receive a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

In some examples of the method, receiving wireless devices, and non-transitory computer-readable medium described herein, the grant may be obtained in a PDCCH CORESET that is limited to a single subband of the set of subbands.

In some examples of the method, receiving wireless devices, and non-transitory computer-readable medium described herein, the grant may be obtained in a subset of subbands of the set of subbands and the subset of subbands may be based on a capability of the receiving wireless device.

Some examples of the method, receiving wireless devices, and non-transitory computer-readable medium described herein may further include operations, features, means, or instructions for performing symbol demapping of information bits within each subband in the set of subbands based on a physical carrier within the subband, on a frequency band of the subband, or both.

In some examples of the method, receiving wireless devices, and non-transitory computer-readable medium described herein, the different parameters of the second set of parameters include a first modulation order and number of layers for a first subset of subbands associated with a first set of link parameters and a second modulation order and number of layers for a second subset of subbands associated with a second set of link parameters.

In some examples of the method, receiving wireless devices, and non-transitory computer-readable medium described herein, each of one or more codeblocks of the single TB may be mapped to a single subband within the set of subbands or may be mapped across more than one subband within the set of subbands.

Some examples of the method, receiving wireless devices, and non-transitory computer-readable medium described herein may further include operations, features, means, or instructions for performing decoding operations on a per-subband basis or on a partial subband basis for information bits of the single TB.

Some examples of the method, receiving wireless devices, and non-transitory computer-readable medium described herein may further include operations, features, means, or instructions for identifying a total bandwidth that a group of codeblocks of the single TB may be mapped to in the set of subbands, where the total bandwidth may be based on a first bandwidth of a first subset of subbands and a second bandwidth of a second subset of subbands.

Some examples of the method, receiving wireless devices, and non-transitory computer-readable medium described herein may further include operations, features, means, or instructions for demapping a first subset of the group of codeblocks to the first subset of subbands based on the first bandwidth and a second subset of the group of codeblocks to the second subset of subbands based on the second bandwidth.

In some examples of the method, receiving wireless devices, and non-transitory computer-readable medium described herein, each subset of the group of codeblocks may be mapped exclusively to the corresponding subset of subbands.

Some examples of the method, receiving wireless devices, and non-transitory computer-readable medium described herein may further include operations, features, means, or instructions for demapping each codeblock of the group of codeblocks to the first subset of subbands or to the second subset of subbands based on the total bandwidth.

Some examples of the method, receiving wireless devices, and non-transitory computer-readable medium described herein may further include operations, features, means, or instructions for demapping, based on the total bandwidth, on the first bandwidth, and the second bandwidth, a first subset of the group of codeblocks to the first subset of subbands and a second subset of the group of codeblocks to the second subset of subbands.

Some examples of the method, receiving wireless devices, and non-transitory computer-readable medium described herein may further include operations, features, means, or instructions for identifying a number of subbands in the set of subbands to demap each codeblock of the single TB from based on a capability of the receiving wireless device, on a grant-based timeline, or both.

In some examples of the method, receiving wireless devices, and non-transitory computer-readable medium described herein, the grant-based timeline includes a first time between obtaining the grant and receiving the single TB or on a second time between receiving the single TB and a feedback message transmission associated with reception of the single TB.

In some examples of the method, receiving wireless devices, and non-transitory computer-readable medium described herein, each subband in the set of subbands may be associated with a common subcarrier spacing.

In some examples of the method, receiving wireless devices, and non-transitory computer-readable medium described herein, one or more subbands in the set of subbands may be associated with a different subcarrier spacing.

Some examples of the method, receiving wireless devices, and non-transitory computer-readable medium described herein may further include operations, features, means, or instructions for demapping each codeblock in the single TB from one or more subbands in the set of subbands that may be associated with a common subcarrier spacing.

Some examples of the method, receiving wireless devices, and non-transitory computer-readable medium described herein may further include operations, features, means, or instructions for demapping one or more codeblocks in the single TB from a subset of subbands associated with the different subcarrier spacing.

In some examples of the method, receiving wireless devices, and non-transitory computer-readable medium described herein, a feedback timeline associated with receiving the single TB may be based on a subband having a smallest subcarrier spacing or a subcarrier spacing associated with an absolute largest processing timeline.

In some examples of the method, receiving wireless devices, and non-transitory computer-readable medium described herein, the different parameters of the second set of parameters include different modulation orders for different subbands in the set of subbands.

Some examples of the method, receiving wireless devices, and non-transitory computer-readable medium described herein may further include operations, features, means, or instructions for deinterleaving, in a uniform systemic bit priority mapper, bits of a first codeblock of the single TB from a first subband associated with a first modulation order and a second codeblock of the single TB from a second subband associated with a second modulation order.

Some examples of the method, receiving wireless devices, and non-transitory computer-readable medium described herein may further include operations, features, means, or instructions for deinterleaving, in a non-uniform systemic bit priority mapper, bits of a first codeblock of the single TB and a second codeblock of the single TB from a first subband associated with a first modulation order and from a second subband associated with a second modulation order.

Some examples of the method, receiving wireless devices, and non-transitory computer-readable medium described herein may further include operations, features, means, or instructions for obtaining an indication of an interleaving parameter for the single TB, where the interleaving parameter may be based on a capability of the receiving wireless device.

Some examples of the method, receiving wireless devices, and non-transitory computer-readable medium described herein may further include operations, features, means, or instructions for demapping modulated symbols of the single TB from spatial layers on a per-subband basis.

BRIEF DESCRIPTION OF THE DRAWINGS

FIG. 5 shows an example of a mapping configuration that supports physical shared channel design for flexible spectrum integration in accordance with one or more aspects of the present disclosure.

FIGS. 13 through 17 show flowcharts illustrating methods that support physical shared channel design for flexible spectrum integration in accordance with one or more aspects of the present disclosure.

DETAILED DESCRIPTION

Wireless networks may use carrier aggregation (CA) techniques to communicate data with a user equipment (UE) via a set of cells, with each cell being associated with a specific component carrier (CC). Individual cells, and their corresponding CCs, are activated or deactivated using signaling from the network entity to the UE. Communicating data via the CCs is generally on a per-CC basis. For example, the UE (the transmitting device, in this example) may generate a transport block to communicate the data for each CC of each cell based on the available resource(s) or parameters of the cell. However, such techniques may not support a flexible spectrum integration (FSI) technique where a single virtual cell is configured for communications with the UE via an integrated spectrum channel.

Accordingly, the described techniques provide various examples of techniques that may be applied when a transmitting device and a receiving device are communicating via a single virtual cell in an integrated spectrum channel. The integrated spectrum channel may be formed by combining frequency resources from multiple frequency bands into subbands. Each subband may generally include a subset of frequency resources within a physical carrier, a single physical carrier, or multiple physical carriers. Accordingly, the transmitting device may obtain or otherwise identify an indication of the integrated spectrum channel of the single virtual cell. The transmitting device may obtain a grant that schedules communications with a receiving wireless device in the subbands of the integrated spectrum channel. The transmitting device may generate a single transport block (TB) for transmitting the data to the receiving wireless device over the subband(s) of the integrated spectrum channel. In some aspects, a first set of parameters used for generating the single TB may be common parameters across the subbands while a second set of parameters may be different parameters between the subbands. The transmitting device may transmit or otherwise output the single TB to the receiving device in the integrated spectrum channel based on the grant.

Aspects of the disclosure are initially described in the context of wireless communications systems. Aspects of the disclosure are further illustrated by and described with reference to apparatus diagrams, system diagrams, and flowcharts that relate to physical shared channel design for flexible spectrum integration.

Figure 1:
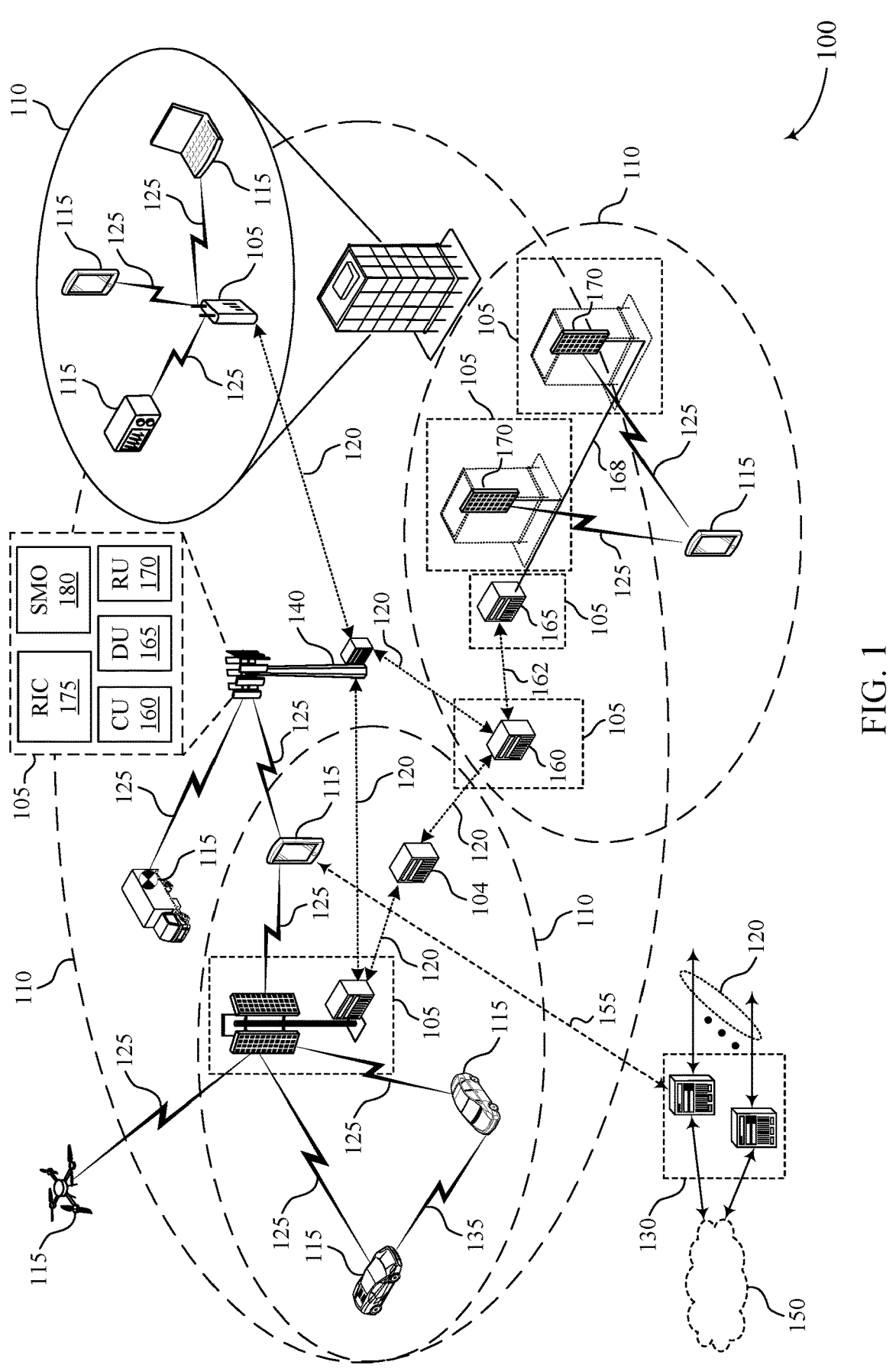
FIG. 1 shows an example of a wireless communications system that supports physical shared channel design for flexible spectrum integration in accordance with one or more aspects of the present disclosure.

FIG. 1 shows an example of a wireless communications system 100 that supports physical shared channel design for flexible spectrum integration in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node (s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A transmitting device (e.g., a UE 115 or a network entity 105) may obtain an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band. The transmitting device may obtain a grant via at least one subband of the set of subbands, the grant scheduling communications with a receiving wireless device in the integrated spectrum channel. The transmitting device may generate a single transport block corresponding to a transmission of data over the set of subbands of the integrated spectrum channel, wherein a first set of parameters for generating the single transport block comprises common parameters for each subband in the set of subbands and a second set of parameters for generating the single transport block comprises different parameters for at least one subband in the set of subbands. The transmitting device may transmit the single transport block to the receiving wireless device in the integrated spectrum channel according to the grant.

A receiving device (e.g., a UE 115 or a network entity 105) may obtain an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band. The receiving device may obtain a grant via at least one subband of the set of subbands, the grant scheduling communications with a transmitting wireless device in the integrated spectrum channel. The receiving device may receive a single transport block from the transmitting wireless device in the integrated spectrum channel according to the grant, wherein the single transport block corresponds to a transmission of data over the set of subbands of the integrated spectrum channel, wherein a first set of parameters of the single transport block comprises common parameters for each subband in the set of subbands and a second set of parameters of the single transport block comprises different parameters for at least one subband in the set of subbands.

Figure 2:
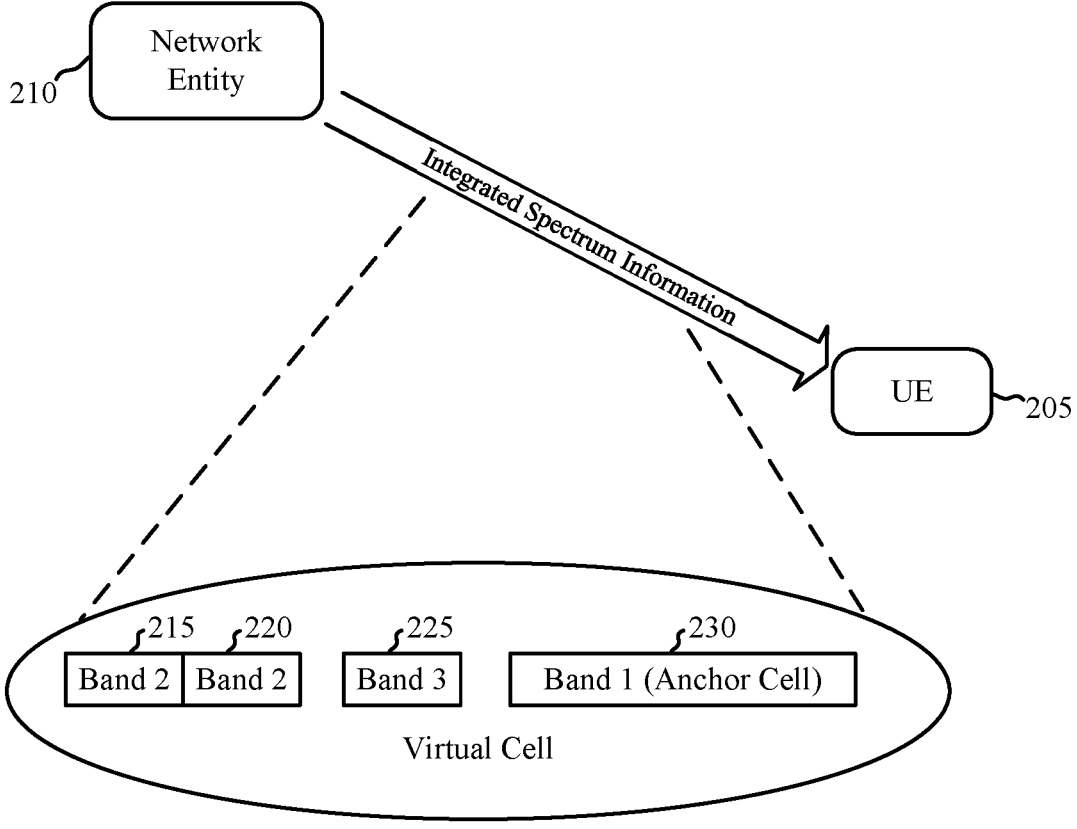
FIG. 2 shows an example of a wireless communications system that supports physical shared channel design for flexible spectrum integration in accordance with one or more aspects of the present disclosure.

FIG. 2 shows an example of a wireless communications system 200 that supports physical shared channel design for flexible spectrum integration in accordance with one or more aspects of the present disclosure. Wireless communications system 200 may implement aspects of wireless communications system 100. Wireless communications system 200 may include a UE 205 and a network entity 210, which may be examples of the corresponding devices described herein.

As discussed above, wireless networks may use CA techniques to communicate data with a UE via a set of cells, with each cell being associated with a specific CC. Communicating data via the CCs is generally on a per-CC basis. For example, the UE (the transmitting device, in this example) may generate a TB to communicate data for each CC of each cell based on the available resource(s) or parameter(s) of the cell.

Generating the TB in such CA-based wireless networks may begin with determining the number of resource elements (REs) allocated for a physical shared channel (e.g., PDSCH/PUSCH, which may be referred to as PxSCH) within a physical resource block (PRB). The RE is generally the smallest unit of a resource grid that consists of one subcarrier or tone in the frequency domain and one OFDM symbol in the time domain. Determining the number of REs allocated for PDSCH/PUSCH within a PRB may be performed according to:

$$N'_{RB} = N_{sc}^{RB} \cdot N_{symb}^{sh} - N_{DMRS}^{PRB} - N_{oh}^{PRB}$$

where $$N'_{RB}$$

is the number of REs for the PRB, $$N_{symb}^{sh}$$

is the number of symbols per slot that have been allocated to the UE, $$N_{sc}^{RB}$$

is the number of resource block(s) (RB)(s) per subcarrier, $$N_{DMRS}^{PRB}$$

is the number of REs per PRB dedicated to DMRS, and $$N_{oh}^{PRB}$$

is the number of REs associated with various overhead (e.g., which reduce the number of REs available for data transfer).

The next step is to determine the number of REs allocated for PDSCH/PUSCH, which may be performed according to:

$$N_{RE} = \min(156, N'_{RE}) \cdot n_{PRB}$$

where $N_{RE}$ is the number of REs needed and $n_{PRB}$ is the number of PRBs allocated to the UE. If the value of N is greater than 156, then $N_{RE}$ is rounded down to 156 (e.g., the UE does not assume a resource allocation of more than 156 REs within the bandwidth of a single RB). Accordingly, $N_{RE}$ represents the total number of REs available for data transfer.

An unquantized intermediate variable is obtained according to:

$$N_{info} = N_{RE} \cdot R \cdot Q_m \cdot v$$

where R represents the coding rate, $Q_m$ represents the modulation order, and v represents the number of layers (e.g., based on the number of allocated DMRS ports).

The variable $N_{info}$ is then used to determine the closes TB size (TBS) using (pre) configured tables. For example, if $N_{info}$ is less than 3824 bits, then a first routine may be applied. Otherwise, a second routine may be applied.

Accordingly, the information bits (A) to be communicated are designated as $a_0, a_1, a_2, \ldots, a_{A-1}$ and then delivered to layer one (L1). CRC bits (L) are added prior to channel coding, where L is equal to 24 if A is greater than 3824 or L equals 16 otherwise. That is, a TB having a size of less than 3824 bits may have 16 CRC bits added. The TB bits after CRC attachment may be denoted as $b_0, b_1, b_2, \ldots, b_{B-1}$ where B is equal to A plus L.

LDPC base graph selection may be performed where, if A is less than or equal to 292 or if A is less than or equal to 3824 and R is less than or equal to 0.25, base graph 2 may be used. Otherwise, base graph 1 is used. That is, the threshold of 3824 may be based on the maximum code block (CB) size of 3840 bits that can be processed by the LDPC channel coding when using base graph 2. LDPC base graph 1 can process a maximum of 8448 bits, so TBs that are less than 3824 bits in size do not require segmentation prior to channel coding for both base graph 1 or base graph 2.

Accordingly, CB segmentation may be performed when B is greater than $K_{cb}$, where $K_{cb}$ is the maximum CB size. If CB segmentation is performed, then additional CRC bits of L=24 is attached to each CB. For base graph 1, $K_{cb}$ is 8448. For base graph 2, $K_{cb}$ is 3840. The input to this step is designated as $b_0, b_1, b_2, \ldots, b_{B-1}$ and the output of this step, assuming CB segmentation is performed, is designated as $c_{r_0}, c_{r_1}, c_{r_2}, \ldots, c_{r_{(Kr-1)}}$ where $0 \le r < C$ is the code block number, and $K_r = K$ is the number of bits for the code block number r.

Encoding is performed next with the input to the encoding step being $c_{r_0}, c_{r_1}, c_{r_2}, \ldots, c_{r_{(Kr-1)}}$ and the output sequence being denoted as $d_0, d_1, d_2, \ldots, d_{N-1}$ where N is equal to $66Z_C$ for LDPC base graph 1 and N is equal to $50Z_C$ for LDPC base graph 2, where $Z_C$ refers to a lifting size that may range from 2 to 384 for each base graph.

Bit selection and limited buffer rate matching (LBRM) are performed on the encoded bits. For example, the bits sequence after encoding, $d_0, d_1, d_2, \ldots, d_{N-1}$, is then written to a circular buffer having a length of $N_{cb}$ for the r'th CB. If the length of the LBRM ($L_{LBRM}$) is equal to zero, $N_{cb}$ is equal to N. Otherwise, $N_{cb}$ is determined according to:

$$N_{cb} = \min(N, N_{ref}) \text{ with } N_{ref} = \left\lfloor \frac{TBS_{LBRM}}{C \cdot R_{LBRM}} \right\rfloor$$

where min (N, $N_{ref}$) corresponds to the code length that is equal to 3 k bits for base graph 1 or 5 k bits for base graph 2 and where k is the number of information bits in one CB. $TBS_{LBRM}$ may be a maximum TBS assuming a maximum number of layers for one TB, a maximum modulation order, a maximum code rate of 0.926, and a maximum number of data REs (e.g., REs=156*$R_{LBRM}$). C may correspond to the number of CBs of the actual TB (e.g., not a maximum TB). $R_{LBRM}$ may be ⅔.

The rate matching output sequence length of r'th CB, denoted by $E_r$, may be given according to:

$$E_r = N_L \cdot Q_m \cdot \left\lfloor \frac{G}{N_L \cdot Q_m \cdot C'} \right\rfloor$$

where G is the total number of coded bits available for transmission in the TB, $N_L$ is the number of transmission layers that the TB is mapped onto, $Q_m$ is the modulation order, and C' is equal to C if CB group transmission information (CBGTI) is not present. Depending on the redundancy version (RV) index, the output bit sequence is generated and denoted as $e_k$: k=0, 1, 2, . . . , E−1.

The next step is systemic bit priority mapping (SBPM) where the systematic bits are put into the most significant bits (MSBs) of the modulated symbols. This may be performed where the bits are written in a row-first manner and then read in a column-first manner. This may be based on the modulation order in the column domain and based on the rate matching output divided by the modulation order in the row domain. For a given codeword, the modulated symbols are first mapped across layers, then over frequency resources, and then over time resources. For a codeword q, the complex-valued modulation symbols are $$d^{(q)}(0), \ldots, d^{(q)}\left(M_{symb}^{(q)} - 1\right),$$

which are mapped onto layers $$x(i) = \left[x^{(0)}(i) \ldots x^{(v-1)}(i)\right]^T, i = 0, 1, \ldots, M_{symb}^{layer} - 1.$$

For example, the codeword-to-layer mapping for spatial multiplexing may be based on Table 1.

TABLE 1

| Number of layers | Number of codewords | Codeword-to-layer mapping $i = 0.1, \ldots, M_{symb}^{layer} - 1$ |
|---|---|---|
| 1 | 1 | $x^{(0)}(i) = d^{(0)}(i) \ M_{symb}^{layer} = M_{symb}^{(0)}$ |
| 2 | 1 | $x^{(0)}(i) = d^{(0)}(2i) \ M_{symb}^{layer} = M_{symb}^{(0)}/2$ <br> $x^{(1)}(i) = d^{(0)}(2i + 1)$ |
| 3 | 1 | $x^{(0)}(i) = d^{(0)}(3i) \ M_{symb}^{layer} = M_{symb}^{(0)}/3$ <br> $x^{(1)}(i) = d^{(0)}(3i + 1)$ <br> $x^{(2)}(i) = d^{(0)}(3i + 2)$ |
| 4 | 1 | $x^{(0)}(i) = d^{(0)}(4i) \ M_{symb}^{layer} = M_{symb}^{(0)}/4$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ |
| 5 | 2 | $x^{(0)}(i) = d^{(0)}(2i) \ M_{symb}^{layer} = M_{symb}^{(0)}/$ <br> $x^{(1)}(i) = d^{(0)}(2i + 1) \ 2 = M_{symb}^{(1)}/3$ <br> $x^{(2)}(i) = d^{(1)}(3i)$ <br> $x^{(3)}(i) = d^{(1)}(3i + 1)$ <br> $x^{(5)}(i) = d^{(1)}(3i + 2)$ |

Table 1

Antenna port mapping may be performed next and according to:

$$\begin{bmatrix} y^{p_0}(i) \\ \cdot \\ \cdot \\ \cdot \\ y^{p_{v-1}}(i) \end{bmatrix} = \begin{bmatrix} x^0(i) \\ \cdot \\ \cdot \\ \cdot \\ x^{v-1}(i) \end{bmatrix}$$

where $$i = 0, 1, \ldots, M_{symb}^{ap} - 1$$

and $$M_{symb}^{ap} = M_{symb}^{layer}.$$

The set of antenna ports $\{p_0, p_1, \ldots, p_{v-1}\}$ may be determined according to various techniques. Finally, the physical RBs may be mapped to virtual RBs (e.g., in a RE-to-layer manner).

While these TB generation techniques may be applicable on a per-CC basis (e.g., such as in CA techniques), they may not be sufficient for different frequency-based allocation schemes. For example, each of the techniques discussed above is applied to generate a TB for transmission on an individual CC. The CC may be for a single cell operating in a single frequency band and associated with a single set of link parameters.

However, the wireless communications system 200 may use a flexible spectrum integration (FSI) approach. Broadly, the FSI approach may include mixing and matching frequency resources from different frequency bands to form a virtual cell (e.g., to support single-cell operations). In the non-limiting example shown in FIG. 2, this may include the virtual cell including an integrated spectrum channel formed using a set of subbands that are formed by combining frequency resources from multiple frequency bands. For example, a first subband 215 and a second subband 220 may be formed using frequency resources from frequency band 2, a third subband 225 may be formed using frequency resources from frequency band 3, and a fourth subband 230 may be formed using frequency resources from frequency band 1. Accordingly, each subband in the set of subbands may include a subset of frequency resources within a physical carrier, a single physical carrier, or multiple physical carriers within the corresponding frequency band. Frequency band 1 may generally be associated with or otherwise designated as an anchor cell (e.g., associated with scheduling wireless communications for the virtual cell).

In some aspects, a transmitting device may receive or otherwise obtain an indication of the information for the integrated spectrum channel. For example, when the transmitting device is the UE 205, this may include the network entity 210 transmitting or otherwise outputting (and the UE 205 receiving or otherwise obtaining) the information regarding the integrated spectrum channel. The network entity 210, in this example, may obtain the information for the integrated spectrum channel by forming, selecting, or otherwise allocating the information and then providing this to the UE 205. The UE 205, in this example, may obtain the information for the integrated spectrum channel from the network entity 210. In an example where the transmitting device is the UE 205, this may include the UE 205 receiving an indication of the information from the network entity 210 or via other (pre) configured information associated with the network entity 210.

Accordingly, a single TB (e.g., for downlink communications when the network entity 210 is the transmitting device or for uplink communications when the UE 205 is the transmitting device) may be scheduled over the set of non-contiguous frequency resources (e.g., over the integrated spectrum channel). A non-contiguous BWP may be configured that spans over the set of aggregated frequency resources across different physical channels. Additionally, or alternatively, separate BWPs may be configured on different subbands where the signal TB is scheduled across the different subbands. In the uplink example, for CP-OFDM, the single TB may be mapped to multiple non-contiguous chunks of the frequency spectrum. In the uplink example, for DFT-s-OFDM, there may be some peak-average-power-ratio (PAPR) considerations with regards to non-contiguous frequency resource mapping. If the UE 205 has multiple power amplifiers with each being connected to one contiguous segment, the single TB may be mapped to a non-contiguous set of frequency resources without PAPR impacts.

Communicating a single TB over the integrated spectrum channel may support additional diversity in lower frequency bands (e.g., small FDD bands). This may support a single CC CCE/blind decoding operations of the UE. Different from CA techniques, the integrated spectrum channel approach does not require scaling up the PDCCH load with the number of CCs (e.g., due to the anchor cell), thereby significantly reducing UE power consumption. This may provide additional bandwidth adaptations using BWP mechanisms, which is less complex and resource-intensive than secondary cell addition, release, activation, and deactivation mechanisms associated with CA techniques.

In some aspects, this may include some wireless communication parameters being set differently for different portions of the frequency resources that the single TB spans. Under the CA approach, the link adaptation for each CC is independent and tailored towards matching the channel condition. Under the FSI approach, if link adaptation is not performed per-subband and is instead done for the worst case or average case, there may be a throughput loss as compared to CA. However, having some shared wireless communication parameters and other distinct wireless communication parameters in the FSI approach (e.g., such as the modulation order and rank) may mitigate these issues. For a single TB, the coding rate may be fixed across different CBs and the TDRA (e.g., such as the starting and ending boundaries) may be fixed across all subbands. However, other parameters, such as the modulation order and the number of layers may be adapted per-subband.

Accordingly, the transmitting device may obtain a grant via at least one of the subbands in the set of subbands that schedules communications with a receiving device in the integrated spectrum channel. When the transmitting device is the network entity 210, this may include the network entity 210 selecting, allocating, or otherwise determining resources and communication parameters to be used for downlink communications to the UE 205. The network entity 210 may transmit the grant to the UE 205 that carries or otherwise conveys an indication of the resources or communication parameters to be used for the downlink communications. When the transmitting device is the UE 205, this may include the UE 205 receiving an uplink grant from the network entity 210 that identifies resources or communication parameters to be used for uplink communications to the network entity 210.

The transmitting device may generate a single TB that corresponds to a transmission of data over the set of subbands of the integrated spectrum channel. A first set of parameters for generating the single TB may include common parameters for each subband in the set of subbands and a second set of parameters for generating the single TB that includes different parameters for at least one subband in the set of subbands. For example, the second set of parameters may include a different modulation order and rank to be applied in different subbands. The transmitting device may generally transmit or otherwise provide (and the receiving device may receive or otherwise obtain) the single TB in the integrated spectrum channel according to the grant.

For example, the virtual cell may include S subbands wherein S=0, 1, 2, . . . , S−1. In the non-limiting example shown in FIG. 2, S=4. Across different subbands, the modulation order and rank may be different. However, the coding rate may be unique (e.g., the first set of communication parameters may include the coding rate). The TBS determination for the TB may be adjusted or otherwise occur on a per-subband basis (e.g., rather than on a per-CC basis). Determining the number of REs allocated for PDSCH/PUSCH within a PRB may include the transmitting device and the receiving device (e.g., to determine the TBS) calculating, for each subband in the set of subbands, a first number of REs available for the transmission of data within each PRB of a corresponding subband. For example, determining the number of REs allocated for PDSCH/PUSCH within a PRB of a subband may be performed according to:

$$N'_{RB,s} = N^{RB}_{sc,s} \cdot N^{sh}_{symb,s} - N^{PRB}_{DMRS,s} - N^{PRB}_{oh,s}$$

where the S parameter denotes the calculation is performed for each subband. Moreover, the transmitting device may calculate a second number of REs available for the transmission of data within each subband based on a number of PRBs within the corresponding subband and the first number of REs. For example, determining the number of REs allocated for PDSCH/PUSCH on each subband may be performed according to:

$$N_{RE,s} = \min(156, N'_{RE,s}) \cdot n_{PRB,s}$$

The unquantized intermediate value (e.g., $N_{info}$) may be determined by the transmitting device by calculating a total number of information bits available for the transmission of data for all subbands within the set of subbands based on the first number of REs and the second number of REs. The transmitting device may then select the TBS for the single TB based on the total number of information bits. For example, the unquantized intermediate value may be obtained according to:

$$N_{info} = \sum_{s=0}^{S-1} N_{RE,s} \cdot R \cdot Q_{m,s} \cdot v_s$$

where $N_{info}$ is then used to determine the closest TBS using (pre) configured tables.

In some examples, the TB CRC, base graph selection, CB segmentation, and encoding may be performed according to the techniques discussed above. However, the LBRM calculation, if enabled, may be performed by separately accounting for different subbands. That is, the transmitting device may apply LBRM by calculating a TBS of LBRM based on a maximum value of one or more parameters that are configured for different subbands. For example, this may be performed according to:

if $L_{LBRM} = 0$, $N_{cb} = N$, otherwise, $$N_{cb} = \min(N, N_{ref}) \text{ with } N_{ref} = \left\lfloor \frac{TBS_{LBRM}}{C \cdot R_{LBRM}} \right\rfloor$$

where $$TBS_{LBRM} = \sum_{s=0}^{S-1} N_{RE,s} \cdot R \cdot Q_{m,s} \cdot v_s.$$

That is, the TBS for LBRM may be calculated based on a maximum number of REs per-subband, a maximum modulation order per-subband, and the configured maximum number of layers per-subband. The number of subbands for this calculation may be set to a number of configured subbands or active subbands.

Unlike CA, for FSI one PDCCH should trigger the data reception or transmission. If the DCI can be anywhere (e.g., on any subband), the triggering DCI may be on the last subband that the UE checks. After that, the UE has to start dealing with the same load as in CA operations across all CCs. This approach may negatively impact the decoding pipeline of the UE.

Accordingly, aspects of the described techniques may provide for mechanisms to address this decoding pipeline of the UE. As one example, the PDCCH CORESET for FSI scheduling may be configured over one subband only. That is, the grant may be received or otherwise obtained in a single subband of the set of subbands. For example, the grant may be received or otherwise obtained in a PDCCH CORE-SET that is limited to a single subband in the set of subbands. As another example, the number of subbands and also the length of the PDCCH CORESET for FSI scheduling may be based on the capability of the UE. For example, the grant may be received or otherwise obtained in a subset of subbands in the set of subbands. The subset of subbands may be based on a capability of the receiving device (e.g., the UE 205, in this example).

Additional aspects related to wireless communications in the integrated spectrum channel are addressed in the following figures.

Figure 3:
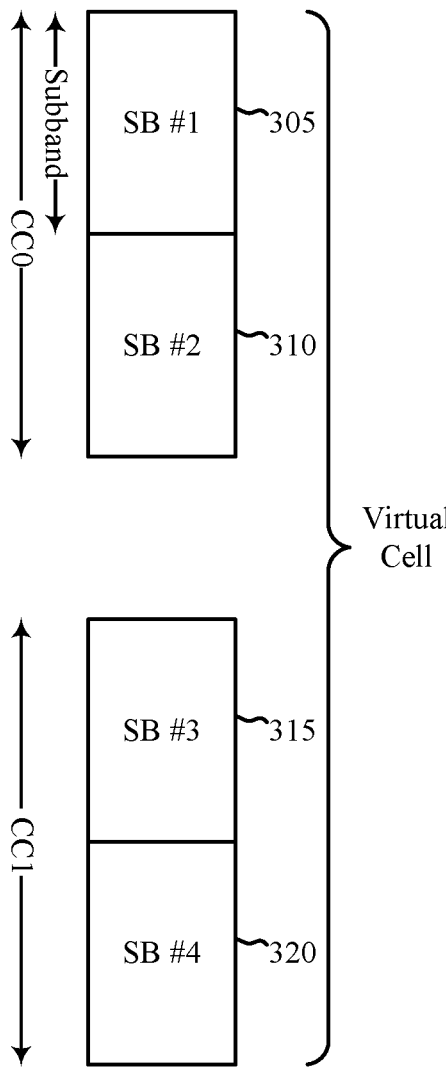
FIG. 3 shows an example of a subband configuration that supports physical shared channel design for flexible spectrum integration in accordance with one or more aspects of the present disclosure.

FIG. 3 shows an example of a subband configuration 300 that supports physical shared channel design for flexible spectrum integration in accordance with one or more aspects of the present disclosure. Subband configuration 300 may implement aspects of wireless communications system 100 or wireless communications system 200. Aspects of subband configuration 300 may be implemented at or implemented by a transmitting device or a receiving device, which may be examples of the corresponding devices described herein. For example, the transmitting device may be a UE performing a transmission to a network entity or may be a network entity performing a transmission to a UE. The receiving device may be a UE receiving a transmission from a network entity or may be a network entity receiving a transmission from a UE.

In the example virtual cell with S subbands, each subband may be or otherwise correspond to one carrier or a portion of one carrier (e.g., one tone, one RB, or a number of tones or RBs). Subband configuration 300 illustrates an example of two subbands per physical CC. For example, a first CC (e.g., CC0) may include a first subband 305 and a second subband 310 and a second CC (e.g., CC1) may include a third subband 315 and a fourth subband 320. The set of subbands, in this example, may include four subbands that are associated with the virtual cell.

The subbands shown in subband configuration 300 may correspond to actual or virtual subbands for the purposes of symbol mapping. For symbol mapping, the actual or physical subbands may be considered. This may be based on the actual subbands being in different physical CCs or frequency bands that are subject to different modulation orders. For example, the transmitting device may perform symbol mapping of information bits within each subband in the set of subbands based on a physical carrier within the or otherwise associated with the subband or based on a frequency band of the subband. The different parameters of the second set of parameters, in this example, may correspond to a first modulation order and number of layers for a first subset of subbands that are associated with a first set of link parameters and a second modulation order and number of layers for a second subset of subbands that are associated with a second set of link parameters.

In some aspects, the symbol mapping may occur in the frequency domain first and then in the time domain second. This example may be suitable when each CC is already large (e.g., no need for distributing the symbols associated with a CB for additional diversity).

Figure 4:
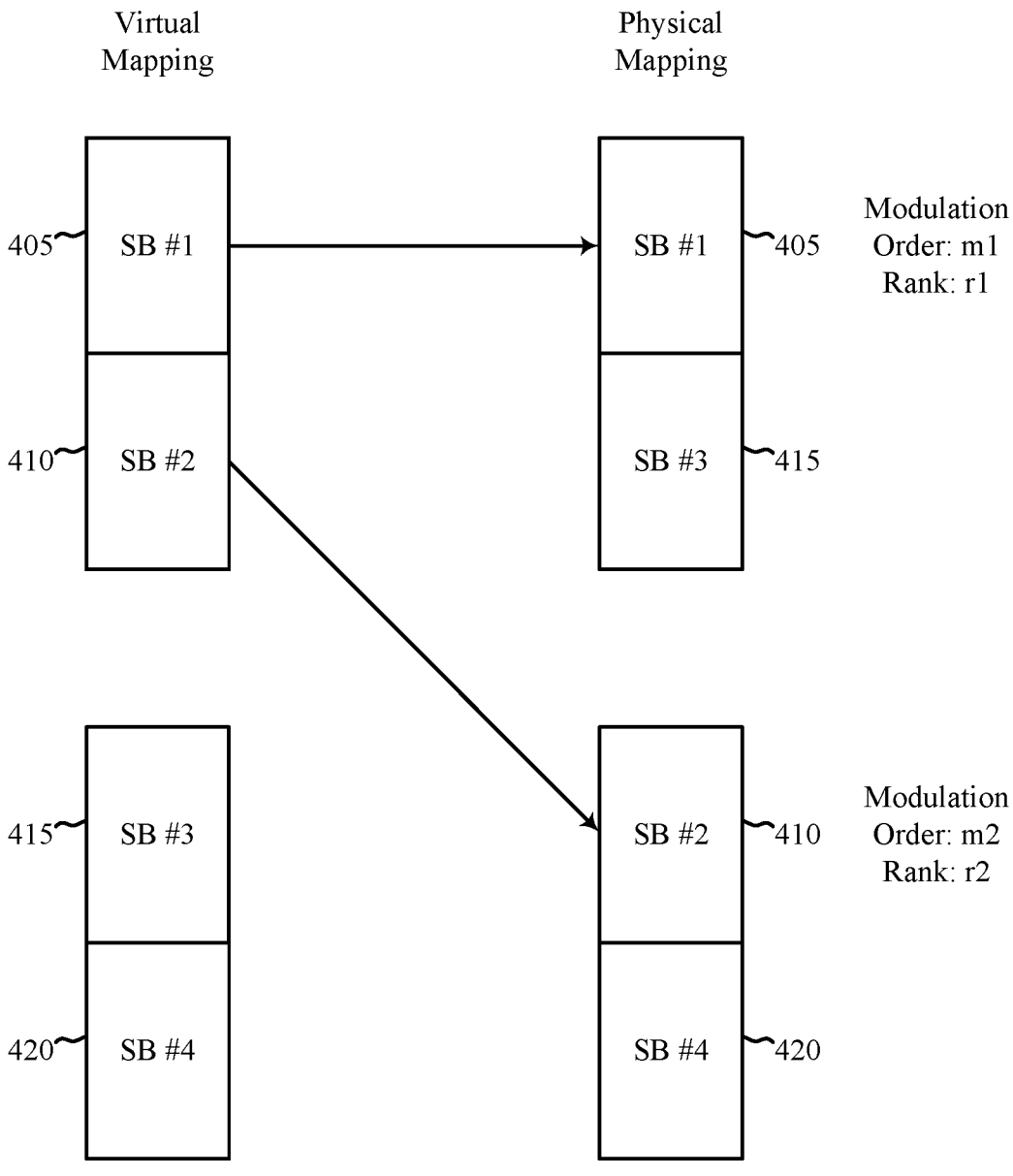
FIG. 4 shows an example of a subband configuration that supports physical shared channel design for flexible spectrum integration in accordance with one or more aspects of the present disclosure.

FIG. 4 shows an example of a subband configuration 400 that supports physical shared channel design for flexible spectrum integration in accordance with one or more aspects of the present disclosure. Subband configuration 400 may implement aspects of wireless communications system 100 or wireless communications system 200. Aspects of subband configuration 400 may be implemented at or implemented by a transmitting device or a receiving device, which may be examples of the corresponding devices described herein. For example, the transmitting device may be a UE performing a transmission to a network entity or may be a network entity performing a transmission to a UE. The receiving device may be a UE receiving a transmission from a network entity or may be a network entity receiving a transmission from a UE.

In the example virtual cell with S subbands, each subband may be or otherwise correspond to one carrier or a portion of one carrier (e.g., one tone, one RB, or a number of tones or RBs). Subband configuration 400 illustrates an example of two subbands per physical CC. For example, a first CC (e.g., CC0) may include a first subband 405 and a second subband 410 and a second CC (e.g., CC1) may include a third subband 415 and a fourth subband 420. The set of subbands, in this example, may include four subbands that are associated with the virtual cell.

The subbands shown in subband configuration 400 may correspond to an interleaved virtual resource block (VRB)-to-PRB scenario that may be suitable when each CC is small. For example, be interleaving across different sub-bands (e.g., more specifically across subbands of different CCs), one CB may achieve increased diversity. For example, the CB can be mapped to the first subband 405 and to the second subband 410 where these subbands are configured or scheduled with different link parameters. In this example, this may include the physical mapping of the first subband 405 and the third subband 415 to the first CC (e.g., CC0) and the second subband 410 and the fourth subband 420 being mapped to the second CC (e.g., CC1). The first CC may be associated with a first modulation order (e.g., m1) and ranking (e.g., r1) while the second CC may be associated with a second modulation order (e.g., m2) and ranking (e.g., r2). Accordingly, different portions of the CB may be modulated differently. In some aspects, the modulated symbol interleaving may be performed on a per-tone basis, on a per-RB basis, or limited to a per-precoding resource group basis.

This may be based on the actual subbands being in different physical CCs or frequency bands that are subject to different modulation orders. For example, the transmitting device may perform symbol mapping of information bits within each subband in the set of subbands based on a physical carrier within the or otherwise associated with the subband or based on a frequency band of the subband. The different parameters of the second set of parameters, in this example, may correspond to a first modulation order and number of layers for a first subset of subbands that are associated with a first set of link parameters and a second modulation order and number of layers for a second subset of subbands that are associated with a second set of link parameters.

Also, different modulated symbols of the same CB may also be treated differently for layer mapping. For example, one CB may be mapped to one subband or to multiple subbands. When mapped to different subbands, these subbands may be subjected to different modulation order and ranks. For example, each of the CB(s) of the single TB may be mapped to a single subband within the set of subbands or may be mapped across more than one subband in the set of subbands.

Precoding may be performed per-subband (e.g., on a per-subband basis) or with a granularity of a number of RBs (e.g., on a partial-subband basis, which is smaller than the subband size) but limited to within the subband. That is, precoding may not be performed across subbands. This may enable channel estimation for each subband to be performed separately.

In some wireless networks, each CB is mapped to only on CC. Accordingly, the UE processes each CC independently. At the receiving device, demapping is performed symbol-by-symbol, but time staggered across different CCs. Decoding is then launched when one CB worth of demapped symbols are available. According to the described techniques, the total bandwidth of the subbands where one CB is mapped may not be larger than a bandwidth of a physical CC. For example, if the UE supports a virtual cell comprising a CC with a bandwidth of 100 MHz in one frequency band and 40 MHz in another frequency band, different options may be adopted by the UE 205. For example, the UE 205 may identify or otherwise determine a total bandwidth that a group of CBs of the single TB is mapped to in the set of subbands. The total bandwidth in this example may be based on a first bandwidth of a first subset of the subbands (e.g., the 100 MHz bandwidth) and a second bandwidth of a second subset of the subbands (e.g., the 40 MHz bandwidth).

A first option may include, when there are two groups of CBs, one group is mapped to subbands where the total bandwidth is 100 MHz and another group is mapped to the subbands where the total bandwidth is 40 MHz. That is, no CB is mapped across the two sets of subbands in this option. Accordingly, the UE 205 may map a first subset of the group of CBs to the first subset of subbands based on the first bandwidth (e.g., the 100 MHz bandwidth) and a second subset of the group of CBs to the second subset of subbands based on the second bandwidth (e.g., the 40 MHz bandwidth. Again, each subset of the group of CBs are mapped exclusively to the corresponding subset of subbands.

A second option may include each CB being mapped flexibly to subbands with the maximum bandwidth of 140 MHz. That is, the UE 205 may map each CB of the group of CBs to the first subset of subbands or to the second subset of subbands based on the total bandwidth.

A third option may include the first group of CBs being mapped to a set of subbands with a total bandwidth of X and the second group of CBs being mapped to a set of subbands with a total bandwidth of Y where X+Y=140 MHz. That is, the UE 205 may map a first subset of the group of CBs to the first subset of subbands and a second subset of the group of CBs to the second subset of subband. The mapping in this option may be based on the total bandwidth (e.g., 140 MHz), the first bandwidth (e.g., 100 MHz), and the second bandwidth (e.g., 40 MHZ). In some aspects, the values X and Y may have an associated range (e.g., a minimum value and/or a maximum value) such that the total value of X plus Y is equal to 140 Mhz.

Under the first option, with the known mapping of CBs to subbands, the receiving device (e.g., the UE 205) may extract the tones associated with subbands of each group of CBs and treat them as one CC processing. Under the second option, a larger delay may be expected since this option removes the pipelining ability of the receiving device across CCs. The third option may provide a balanced tradeoff between the first and second options.

Furthermore, demapping may be performed only once per CB. However, if the CB is mapped to subbands with different link parameters the demapping may be performed multiple times. This may increase the hardware requirements of the modem at the receiving device. Accordingly, the number of subbands that a CB is mapped to may be defined based on the UE capability. Alternatively, or additionally, certain timelines (e.g., grant-to-PUSCH) or PDSCH-to-PUSCH) may be a function of the number of subbands. Accordingly, the transmitting device (e.g., the UE 205, in this example) may identify or otherwise determine a number of subbands in the set of subbands to map each CB of the single TB to based on a capability of the receiving device or based on a grant-based timeline (e.g., grant-to-PUSCH or PDSCH-to-PUSCH). That is, the grant-based timeline may correspond to a first time between obtaining the grant and transmitting the single TB (e.g., grant-to-PUSCH) or on a second time between transmitting the single TB and a feedback message associated with the transmission of the single TB (e.g., PDSCH-to-PUSCH). For example, the receiving device may report that is can support mapping of a CB to a single subband if the timeline is X1 or that it can support a mapping of a CB to more than one subband if the timeline is extended to X2 where X2 is greater than X1. In some aspects, these capabilities may further be based on whether the subbands have the same or different parameters. For example, a UE can support a timeline of X1 if a TB is mapped to set of SBs and the TB has the same modulation order and number of layers across both of them and a timeline of X2 (e.g., where X2>X1) if the TB has a different modulation order and number of layers across the two SBs.

For example, a downlink or uplink configured minimum processing timeline capability (e.g., similar to N1 or N2 in an NR network) for a given receiving device on a given virtual CC may be unique.

As for the SCS, different scenarios may be considered. One scenario may be that all subbands within a virtual cell may use the same SCS. That is, each subband in the set of subbands may be associated with a common SCS (e.g., the same SCS). Another scenario may be that one or more subbands in the set of subbands may be associated with a different SCS.

For example, one CB may be mapped across subbands that are configured with the same SCS. For example, the transmitting device may map each CB in the single TB to subband(s) that are associated with the common SCS. As one non-limiting example, this may include TDD and FDD CA techniques. With this approach, CBs assigned to the subbands in a TDD band (e.g., SCS=30 kHz) may not be mapped to subbands in the FDD band (e.g., 15 kHz). This approach may provide increased diversity if the TDD segment is already large.

Another example may include the transmitting device mapping one or more CBs in the single TB to a subset of subbands associated with different SCS. In the scenario where one TB is mapped to subbands with different SCS, for TB-based HARQ-ACK, the processing timeline may be based on the minimum processing timeline associated with the smallest SCS (e.g., the minimum value across processing timelines associated with different SCS). That is, a feedback timeline associated with transmitting the single TB may be based on the subband having the smallest SCS or associated with the SCS that has the largest absolute processing timeline.

For CBG-based HARQ-ACK reporting, the minimum processing timeline may be per subband or group of subbands with the same SCS, but as long as the PUCCH transmission is separated. If there is one PUCCH for all HARQ-ACK payloads, the minimum processing timeline may be based on the smallest SCS. This approach may apply for uplink scheduling. When the single TB is mapped to subbands with different SCS, the PUSCH minimum processing timeline may be based on the slowest SCS or associated with the SRS that has the largest absolute processing timeline.

FIG. 5 shows an example of a mapping configuration 500 that supports physical shared channel design for flexible spectrum integration in accordance with one or more aspects of the present disclosure. Mapping configuration 500 may implement aspects of wireless communications system 100 or wireless communications system 200. Aspects of mapping configuration 500 may be implemented at or implemented by a transmitting device or a receiving device, which may be examples of the corresponding devices described herein. For example, the transmitting device may be a UE performing a transmission to a network entity or may be a network entity performing a transmission to a UE. The receiving device may be a UE receiving a transmission from a network entity or may be a network entity receiving a transmission from a UE.

Mapping configuration 500 illustrates further aspects of symbol mapping when transmitting a single TB in an integrated spectrum channel in accordance with the techniques described herein. Once a RB is selected, this may be based on $e_k$: k=0, 1, 2, . . . , E−1 as the sequence of bits for CB i. The CB i may be mapped to two subbands with modulation order of $Q_m$ and $$Q'_m,$$

where $$Q^i_m$$

is less than $$Q_m(\text{e.g., } Q'_m$$

is a QPSK modulation order having two bits 505 per symbol and $Q_m$ is a 16 QAM modulation order having four bits 505 per symbol, in this example). Accordingly, in this example the different parameters in the second set of parameters may correspond to different modulation orders for different subbands in the set of subband. Different approaches may be adopted for SBPM performance.

Mapping configuration 500 illustrates a non-limiting example where SBPM is performed per-subband. That is, the transmitting device may interleave bits 505 of a first CB of the single TB to a first subband associated with a first modulation order $$(\text{e.g., } Q'_m)$$

and bits 505 of a second CB of the single TB to a second subband associated with a second modulation order (e.g., $Q_m$). The interleaving, in this example, may be performed in a uniform SBPM. This may include grouping the input bits (e.g., bits 505) consecutively in two length of $E_{s_1}$ and $E_{s_2}$ where $E=E_{s_1}+E_{s_2}$. The grouping of bits are disjoint and consecutive in this approach. The number of bits 505 per group may be an integer multiplier of the QAM order of the same subband.

Figure 6:
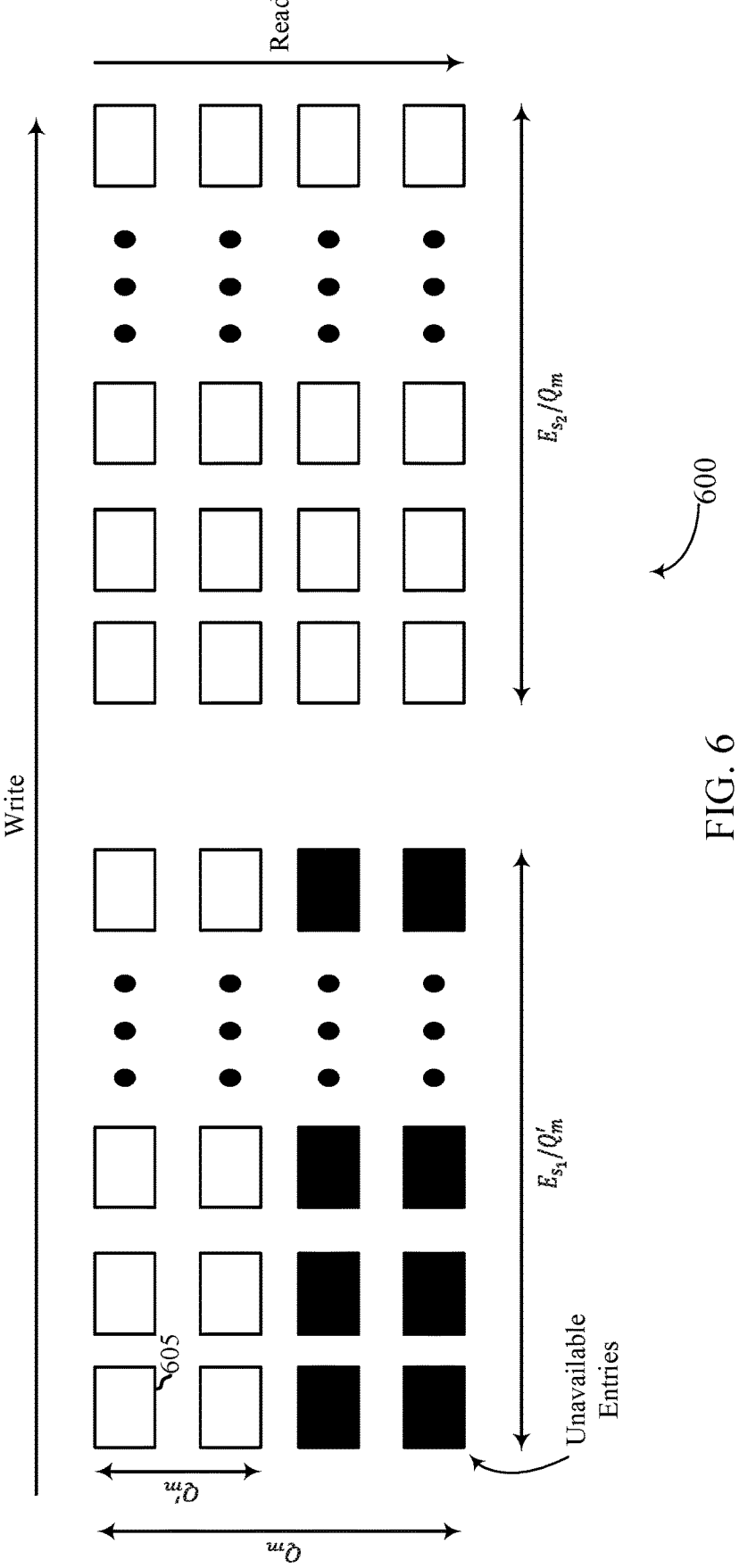
FIG. 6 shows an example of a mapping configuration that supports physical shared channel design for flexible spectrum integration in accordance with one or more aspects of the present disclosure.

FIG. 6 shows an example of a mapping configuration 600 that supports physical shared channel design for flexible spectrum integration in accordance with one or more aspects of the present disclosure. Mapping configuration 600 may implement aspects of wireless communications system 100 or wireless communications system 200. Aspects of mapping configuration 600 may be implemented at or implemented by a transmitting device or a receiving device, which may be examples of the corresponding devices described herein. For example, the transmitting device may be a UE performing a transmission to a network entity or may be a network entity performing a transmission to a UE. The receiving device may be a UE receiving a transmission from a network entity or may be a network entity receiving a transmission from a UE.

Mapping configuration 600 illustrates further aspects of symbol mapping when transmitting a single TB in an integrated spectrum channel in accordance with the techniques described herein. Once a RB is selected, this may be based on $e_k$: k=0, 1, 2, . . . , E−1 as the sequence of bits for CB i. The CB i may be mapped to two subbands with modulation order of $Q_m$ and $$Q'_m,$$

where $$Q'_m$$

is less than $$Q_m(\text{e.g.}, Q'_m$$

is a QPSK modulation order having two bits 605 per symbol and $Q_m$ is a 16 QAM modulation order having four bits 605 per symbol, in this example). Accordingly, in this example the different parameters in the second set of parameters may correspond to different modulation orders for different sub-bands in the set of subband. Different approaches may be adopted for SBPM performance.

Mapping configuration 600 illustrates a non-limiting example where SBPM is performed per CB with non-uniform block interleaving. That is, the transmitting device may interleave bits 605 of a first CB of the single TB and a second CB of the single TB to a first subband associated with a first modulation order $$(\text{e.g.}, Q'_m)$$

and to a second subband associated with a second modulation order (e.g., $Q_m$). The symbol mapping in this example may be based on a non-uniform SBPM. In this approach, one block interleaver whose number of rows is equal to the maximum modulation order across the subbands used for PxSCH symbol mapping is considered. Accordingly, some rows may be excluded depending on the modulation orders. In this non-limiting example, this may include two rows associated with the first subband being excluded for symbol mapping and all four rows associated with the second subband being included for symbol mapping.

The performance of the symbol mapping techniques shown in FIG. 5 and the symbol mapping techniques shown in FIG. 6 may be dependent on how the frequency domain interleaving is designed. For the symbol mapping techniques shown in FIG. 5, systematic bits may be confined within one subband. In this case, these bits may experience less diversity and not all be protected by being placed in the MSB locations. However, if the subband carrying the systematic bits is in a lower frequency band spectrum, for example, these bits may be better protected.

For the symbol mapping techniques shown in FIG. 6, it may be more likely that these systematic bits are protected by being placed on MSB portions of the modulated symbols. However, they may be mapped to different CCs or frequency bands and some of this may be in a higher frequency band spectrum and therefore less protected.

In some aspects, either option may be specified or the choice of the option may be indicted to the receiver. This may be based on a function of the capabilities of the receiving device. For example, the transmitting device may obtain (e.g., select and transmit) an indication of an interleaving parameters for the single TB where the interleaving parameter may be based on the capability of the receiving device.

Figure 7:
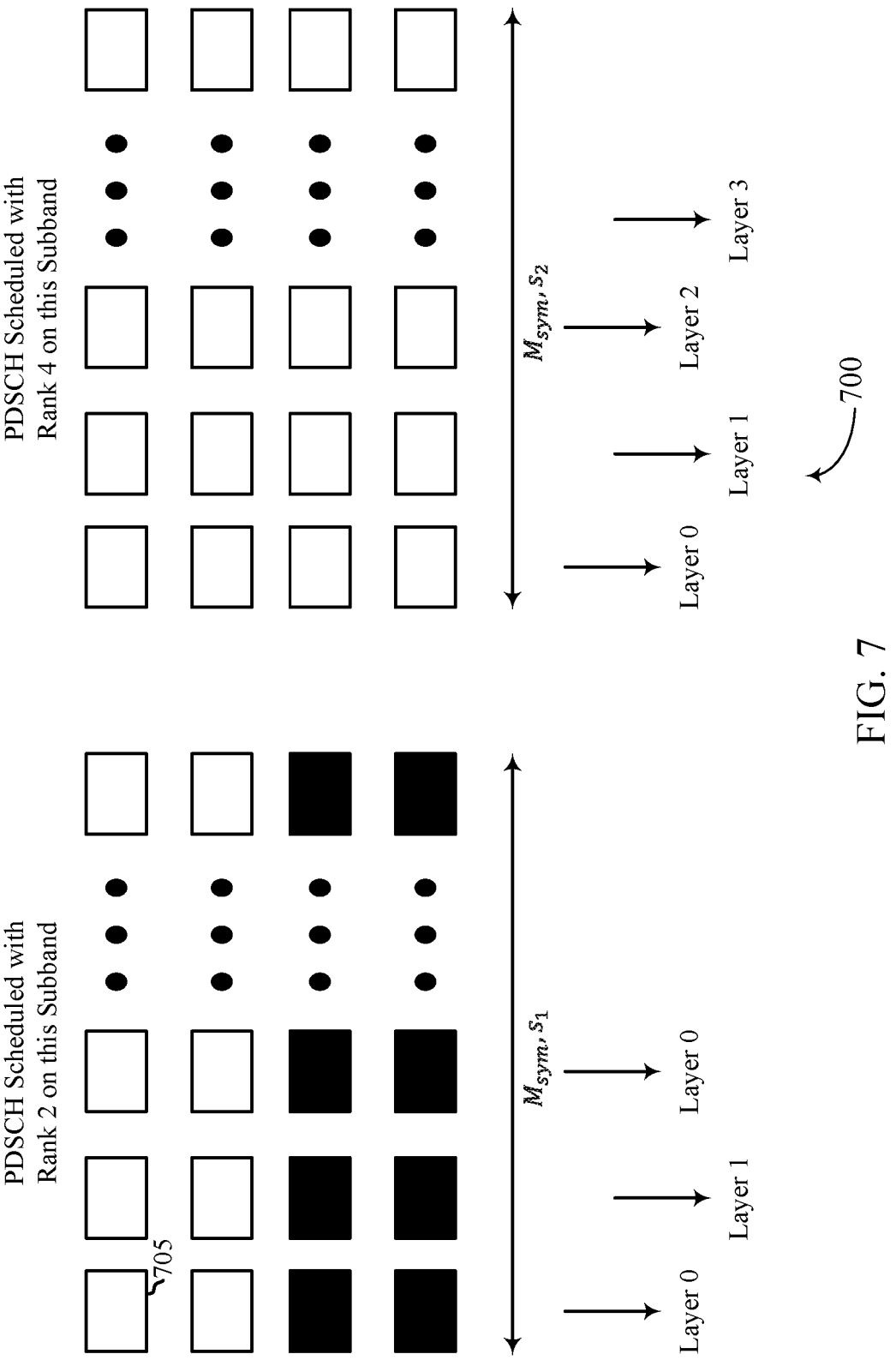
FIG. 7 shows an example of a mapping configuration that supports physical shared channel design for flexible spectrum integration in accordance with one or more aspects of the present disclosure.

FIG. 7 shows an example of a mapping configuration 700 that supports physical shared channel design for flexible spectrum integration in accordance with one or more aspects of the present disclosure. Mapping configuration 700 may implement aspects of wireless communications system 100 or wireless communications system 200. Aspects of mapping configuration 700 may be implemented at or implemented by a transmitting device or a receiving device, which may be examples of the corresponding devices described herein. For example, the transmitting device may be a UE performing a transmission to a network entity or may be a network entity performing a transmission to a UE. The receiving device may be a UE receiving a transmission from a network entity or may be a network entity receiving a transmission from a UE.

Mapping configuration 700 illustrates aspects of layer mapping when transmitting a single TB in an integrated spectrum channel in accordance with the techniques described herein. Generally, the described techniques may include the transmitting device mapping modulated symbols 705 of the single TB to spatial layers on a per-subband basis. That is, under both options (e.g., the symbol mapping configurations shown in FIG. 5 and in FIG. 6), the mapping of the modulated symbols 705 to spatial layers may be performed separately per-subband. This may include taking the total number of modulated symbols 705 per-subband, dividing this by the number of layers and then following the codeword-to-layer mapping for spatial multiplexing shown in Table 2 below.

TABLE 2

| Number of layers | Number of codewords | Codeword-to-layer mapping $i = 0.1, \ldots, M_{symb}^{layer} - 1$ |
|---|---|---|
| 1 | 1 | $x^{(0)}(i) = d^{(0)}(i)\ M_{symb}^{layer} = M_{symb}^{(0)}$ |
| 2 | 1 | $x^{(0)}(i) = d^{(0)}(2i)\ M_{symb}^{layer} = M_{symb}^{(0)}/2$ |
| | | $x^{(1)}(i) = d^{(0)}(2i + 1)$ |
| 3 | 1 | $x^{(0)}(i) = d^{(0)}(3i)\ M_{symb}^{layer} = M_{symb}^{(0)}/3$ |
| | | $x^{(1)}(i) = d^{(0)}(3i + 1)$ |
| | | $x^{(2)}(i) = d^{(0)}(3i + 2)$ |
| 4 | 1 | $x^{(0)}(i) = d^{(0)}(4i)\ M_{symb}^{layer} = M_{symb}^{(0)}/4$ |
| | | $x^{(1)}(i) = d^{(0)}(4i + 1)$ |
| | | $x^{(2)}(i) = d^{(0)}(4i + 2)$ |
| | | $x^{(3)}(i) = d^{(0)}(4i + 3)$ |
| 5 | 2 | $x^{(0)}(i) = d^{(0)}(2i)\ M_{symb}^{layer} = M_{symb}^{(0)}/$ |
| | | $x^{(1)}(i) = d^{(0)}(2i + 1)\ 2 = M_{symb}^{(1)}/3$ |
| | | $x^{(2)}(i) = d^{(1)}(3i)$ |
| | | $x^{(3)}(i) = d^{(1)}(3i + 1)$ |
| | | $x^{(4)}(i) = d^{(1)}(3i + 2)$ |

Mapping configuration 700 illustrates a non-limiting example of layer mapping based on the SBPM approach shown in FIG. 6. For example, mapping configuration 700 illustrates the first subband being associated with the first modulation order $$(\text{e.g.}, Q'_m)$$

and having a first rank of two (indicating two spatial layers available, layer 0 and layer 1) and the second subband being associated with the second modulation order (e.g., $Q_m$) and having a second rank of four (indicating four spatial layers available, layer 0, layer 1, layer 2, and layer 3). The modulated symbols 705 may be alternatively mapped to layer 0 first and then to layer 1 next in the first subband (e.g., $M_{sym,s_1}$. The modulated symbols 705 may be alternatively mapped to layer 0, layer 1, layer 2, and then to layer 3 next in the second subband (e.g., $M_{sym,s_2}$).

It is to be understood that a similar technique may be applied to the SBPM approach shown in FIG. 5.

Figure 8:
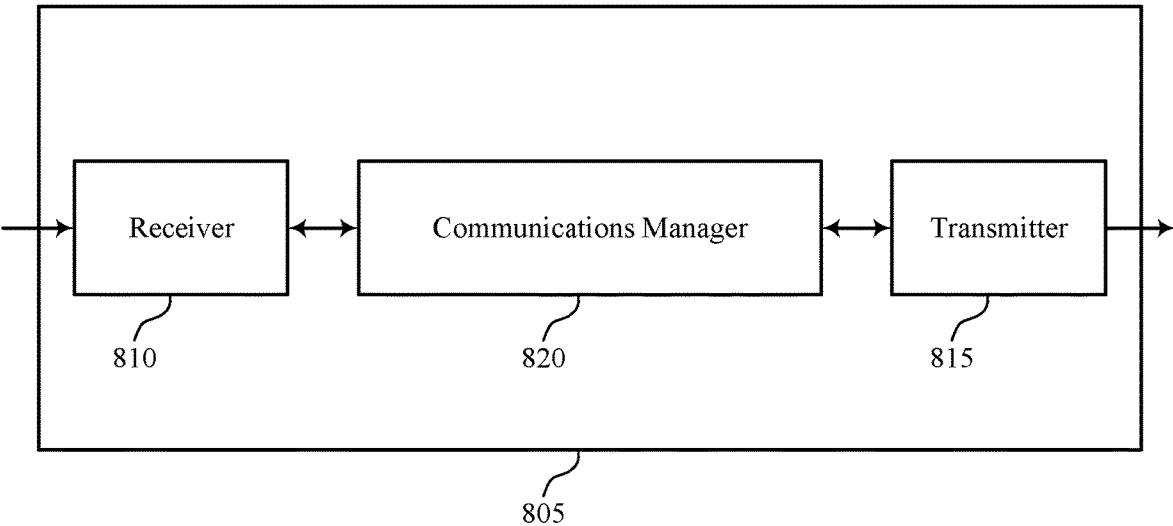
FIGS. 8 and 9 show block diagrams of devices that support physical shared channel design for flexible spectrum integration in accordance with one or more aspects of the present disclosure.

FIG. 8 shows a block diagram 800 of a device 805 that supports physical shared channel design for flexible spectrum integration in accordance with one or more aspects of the present disclosure. The device 805 may be an example of aspects of a UE 115 or a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to physical shared channel design for flexible spectrum integration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to physical shared channel design for flexible spectrum integration). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations or components thereof may be examples of means for performing various aspects of physical shared channel design for flexible spectrum integration as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The communications manager 820 is capable of, configured to, or operable to support a means for obtaining a grant via at least one subband of the set of subbands, the grant scheduling communications with a receiving wireless device in the integrated spectrum channel. The communications manager 820 is capable of, configured to, or operable to support a means for generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The communications manager 820 is capable of, configured to, or operable to support a means for transmitting the single TB to the receiving wireless device in the integrated spectrum channel according to the grant.

Additionally, or alternatively, the communications manager 820 may support wireless communications in accordance with examples as disclosed herein. For example, the communications manager 820 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The communications manager 820 is capable of, configured to, or operable to support a means for obtaining a grant via at least one subband of the set of subbands, the grant scheduling communications with a transmitting wireless device in the integrated spectrum channel. The communications manager 820 is capable of, configured to, or operable to support a means for receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for single TB transmission in an integrated spectrum channel. The single TB may be generated on a per-subband basis, in some aspects, that accounts for the non-contiguous nature of the FSI amalgamation of frequency resources.

Figure 9:
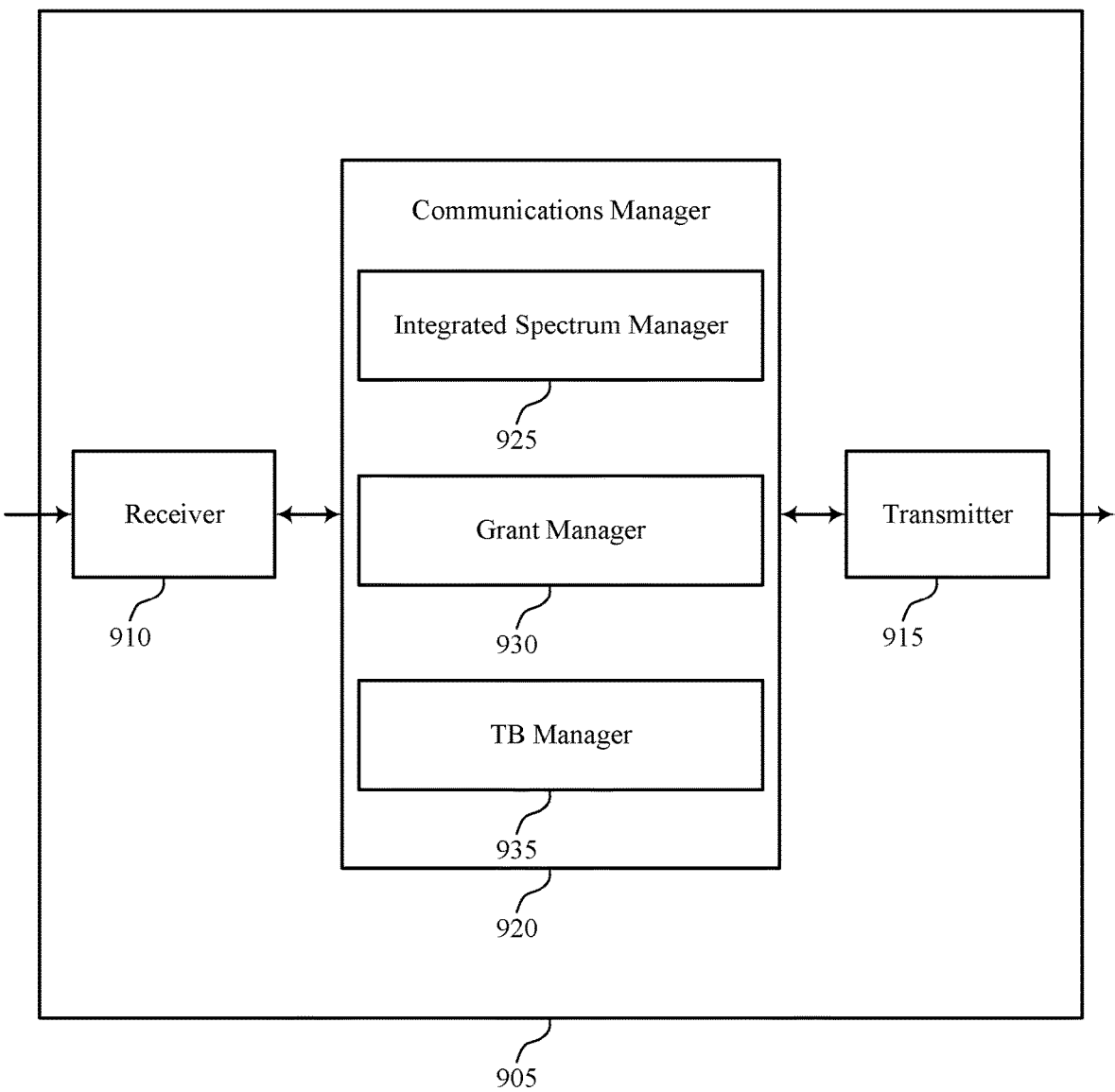

FIG. 9 shows a block diagram 900 of a device 905 that supports physical shared channel design for flexible spectrum integration in accordance with one or more aspects of the present disclosure. The device 905 may be an example of aspects of a device 805, a UE 115, or a network entity 105 as described herein. The device 905 may include a receiver 910, a transmitter 915, and a communications manager 920. The device 905, or one of more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to physical shared channel design for flexible spectrum integration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to physical shared channel design for flexible spectrum integration). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of physical shared channel design for flexible spectrum integration as described herein. For example, the communications manager 920 may include an integrated spectrum manager 925, a grant manager 930, a TB manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The integrated spectrum manager 925 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The grant manager 930 is capable of, configured to, or operable to support a means for obtaining a grant via at least one subband of the set of subbands, the grant scheduling communications with a receiving wireless device in the integrated spectrum channel. The TB manager 935 is capable of, configured to, or operable to support a means for generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The TB manager 935 is capable of, configured to, or operable to support a means for transmitting the single TB to the receiving wireless device in the integrated spectrum channel according to the grant.

Additionally, or alternatively, the communications manager 920 may support wireless communications in accordance with examples as disclosed herein. The integrated spectrum manager 925 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The grant manager 930 is capable of, configured to, or operable to support a means for obtaining a grant via at least one subband of the set of subbands, the grant scheduling communications with a transmitting wireless device in the integrated spectrum channel. The TB manager 935 is capable of, configured to, or operable to support a means for receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

Figure 10:
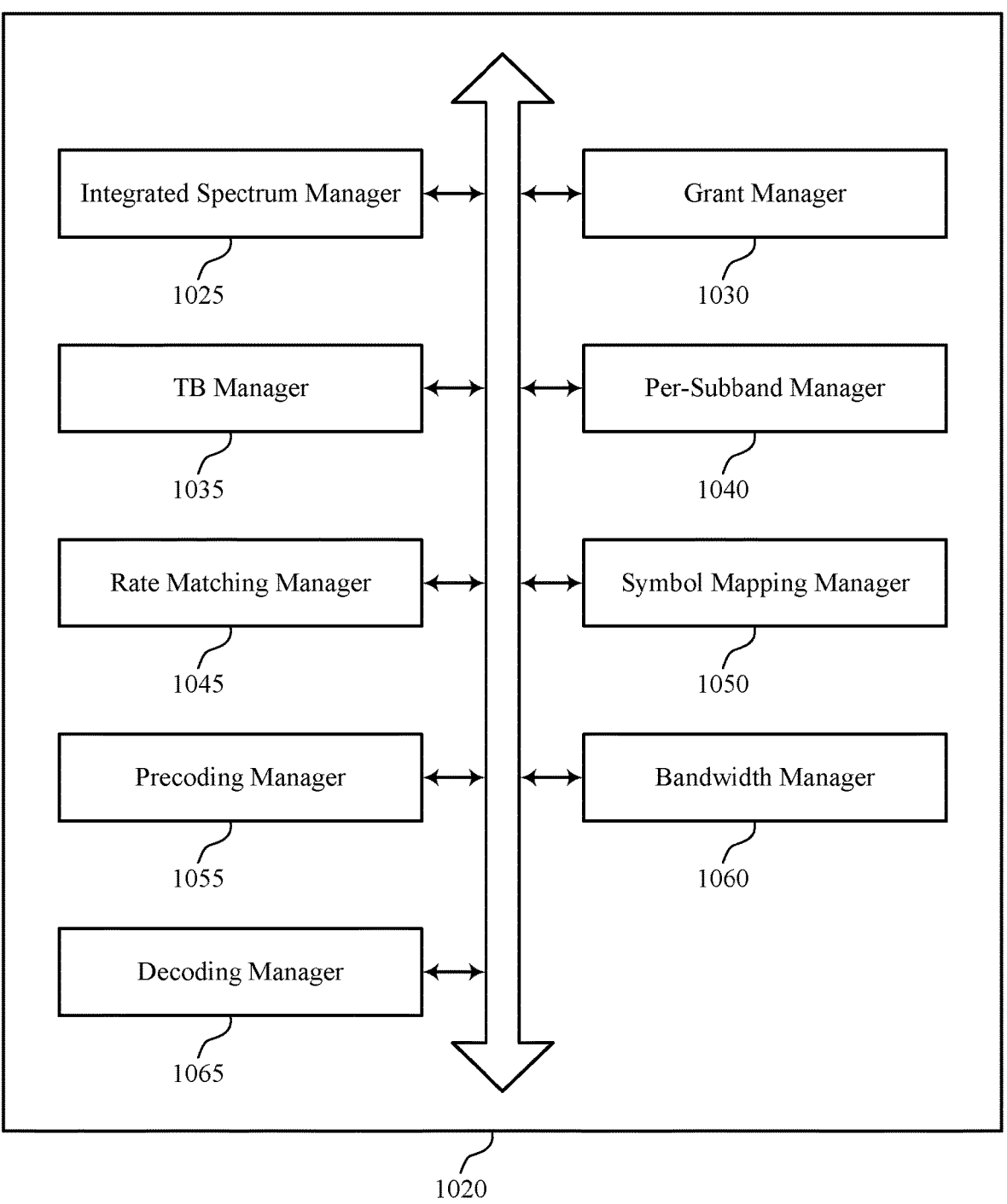
FIG. 10 shows a block diagram of a communications manager that supports physical shared channel design for flexible spectrum integration in accordance with one or more aspects of the present disclosure.

FIG. 10 shows a block diagram 1000 of a communications manager 1020 that supports physical shared channel design for flexible spectrum integration in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of physical shared channel design for flexible spectrum integration as described herein. For example, the communications manager 1020 may include an integrated spectrum manager 1025, a grant manager 1030, a TB manager 1035, a per-subband manager 1040, a rate matching manager 1045, a symbol mapping manager 1050, a precoding manager 1055, a bandwidth manager 1060, a decoding manager 1065, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The integrated spectrum manager 1025 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The grant manager 1030 is capable of, configured to, or operable to support a means for obtaining a grant via at least one subband of the set of subbands, the grant scheduling communications with a receiving wireless device in the integrated spectrum channel. The TB manager 1035 is capable of, configured to, or operable to support a means for generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. In some examples, the TB manager 1035 is capable of, configured to, or operable to support a means for transmitting the single TB to the receiving wireless device in the integrated spectrum channel according to the grant.

In some examples, to support generating the single TB, the per-subband manager 1040 is capable of, configured to, or operable to support a means for calculating, for each subband in the set of subbands, a first number of resource elements available for the transmission of data within each physical resource block of a corresponding subband.

In some examples, the per-subband manager 1040 is capable of, configured to, or operable to support a means for calculating a second number of resource elements available for the transmission of data within each subband based on a number of physical resource blocks within the corresponding subband and the first number of resource elements.

In some examples, the per-subband manager 1040 is capable of, configured to, or operable to support a means for calculating a total number of information bits available for transmission of data for all subbands within the set of subbands based on the first number of resource elements and the second number of resource elements. In some examples, the per-subband manager 1040 is capable of, configured to, or operable to support a means for selecting a TB size for the single TB based on the total number of information bits available for transmission of data.

In some examples, the rate matching manager 1045 is capable of, configured to, or operable to support a means for applying limited buffer rate matching by calculating a transport block size of the limited buffer rate matching based on a maximum value of one or more parameters that are configured for different subbands in the set of subbands.

In some examples, the grant is obtained in a PDCCH CORESET that is limited to a single subband of the set of subbands. In some examples, the grant is obtained in a PDCCH CORESET that is configured in a subset of subbands of the set of subbands. In some examples, a number of subbands in the subset of subbands is based on a capability of the receiving wireless device.

In some examples, to support generating the single TB, the symbol mapping manager 1050 is capable of, configured to, or operable to support a means for performing symbol mapping of information bits within each subband in the set of subbands based on a physical carrier within the subband, on a frequency band of the subband, or both.

In some examples, the different parameters of the second set of parameters include a first modulation order and number of layers for a first subset of subbands associated with a first set of link parameters and a second modulation order and number of layers for a second subset of subbands associated with a second set of link parameters. In some examples, each of one or more CBs of the single TB are mapped to a single subband within the set of subbands or are mapped across more than one subband within the set of subbands.

In some examples, to support generating the single TB, the precoding manager 1055 is capable of, configured to, or operable to support a means for performing precoding operations on a per-subband basis or on a partial subband basis for information bits of the single TB.

In some examples, to support generating the single TB, the bandwidth manager 1060 is capable of, configured to, or operable to support a means for identifying a total bandwidth that a group of CBs of the single TB is mapped to in the set of subbands, where the total bandwidth is based on a first bandwidth of a first subset of subbands and a second bandwidth of a second subset of subbands.

In some examples, the bandwidth manager 1060 is capable of, configured to, or operable to support a means for mapping a first subset of the group of CBs to the first subset of subbands based on the first bandwidth and a second subset of the group of CBs to the second subset of subbands based on the second bandwidth. In some examples, each subset of the group of CBs are mapped exclusively to the corresponding subset of subbands.

In some examples, the bandwidth manager 1060 is capable of, configured to, or operable to support a means for mapping each CB of the group of CBs to the first subset of subbands or to the second subset of subbands based on the total bandwidth. In some examples, the bandwidth manager 1060 is capable of, configured to, or operable to support a means for mapping, based on the total bandwidth, on the first bandwidth, and the second bandwidth, a first subset of the group of CBs to the first subset of subbands and a second subset of the group of CBs to the second subset of subbands.

In some examples, to support generating the single TB, the per-subband manager 1040 is capable of, configured to, or operable to support a means for identifying a number of subbands in the set of subbands to map each CB of the single TB to based on a capability of the receiving wireless device, on a grant-based timeline, or both. In some examples, the grant-based timeline includes a first time between obtaining the grant and transmitting the single TB or on a second time between transmitting the single TB and a feedback message transmission associated with transmission of the single TB. In some examples, each subband in the set of subbands are associated with a common subcarrier spacing. In some examples, one or more subbands in the set of subbands are associated with a different subcarrier spacing.

In some examples, to support generating the single TB, the per-subband manager 1040 is capable of, configured to, or operable to support a means for mapping each CB in the single TB to one or more subbands in the set of subbands that are associated with a common subcarrier spacing. In some examples, to support generating the single TB, the per-subband manager 1040 is capable of, configured to, or operable to support a means for mapping one or more CBs in the single TB to a subset of subbands associated with the different subcarrier spacing.

In some examples, a feedback timeline associated with transmitting the single TB is based on a subband having a smallest subcarrier spacing or a subcarrier spacing associated with an absolute largest processing timeline. In some examples, the different parameters of the second set of parameters include different modulation orders for different subbands in the set of subbands. In some examples, to support generating the single TB, the per-subband manager 1040 is capable of, configured to, or operable to support a means for interleaving, in a uniform systemic bit priority mapper, bits of a first CB of the single TB to a first subband associated with a first modulation order and a second CB of the single TB to a second subband associated with a second modulation order.

In some examples, to support generating the single TB, the per-subband manager 1040 is capable of, configured to, or operable to support a means for interleaving, in a non-uniform systemic bit priority mapper, bits of a first CB of the single TB and a second CB of the single TB to a first subband associated with a first modulation order and to a second subband associated with a second modulation order.

In some examples, the per-subband manager 1040 is capable of, configured to, or operable to support a means for obtaining an indication of an interleaving parameter for the single TB, where the interleaving parameter is based on a capability of the receiving wireless device. In some examples, the per-subband manager 1040 is capable of, configured to, or operable to support a means for mapping modulated symbols of the single TB to spatial layers on a per-subband basis.

Additionally, or alternatively, the communications manager 1020 may support wireless communications in accordance with examples as disclosed herein. In some examples, the integrated spectrum manager 1025 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. In some examples, the grant manager 1030 is capable of, configured to, or operable to support a means for obtaining a grant via at least one subband of the set of subbands, the grant scheduling communications with a transmitting wireless device in the integrated spectrum channel. In some examples, the TB manager 1035 is capable of, configured to, or operable to support a means for receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands. In some examples, the grant is obtained in a PDCCH CORESET that is limited to a single subband of the set of subbands. In some examples, the grant is obtained in a PDCCH CORESET that is configured in a subset of subbands of the set of subbands. In some examples, a number of subbands in the subset of subbands is based on a capability of the receiving wireless device.

In some examples, the symbol mapping manager 1050 is capable of, configured to, or operable to support a means for performing symbol demapping of information bits within each subband in the set of subbands based on a physical carrier within the subband, on a frequency band of the subband, or both. In some examples, the different parameters of the second set of parameters include a first modulation order and number of layers for a first subset of subbands associated with a first set of link parameters and a second modulation order and ranking for a second subset of subbands associated with a second set of link parameters. In some examples, each of one or more CBs of the single TB are mapped to a single subband within the set of subbands or are mapped across more than one subband within the set of subbands.

In some examples, the decoding manager 1065 is capable of, configured to, or operable to support a means for performing decoding operations on a per-subband basis or on a partial subband basis for information bits of the single TB.

In some examples, the bandwidth manager 1060 is capable of, configured to, or operable to support a means for identifying a total bandwidth that a group of CBs of the single TB is mapped to in the set of subbands, where the total bandwidth is based on a first bandwidth of a first subset of subbands and a second bandwidth of a second subset of subbands. In some examples, the bandwidth manager 1060 is capable of, configured to, or operable to support a means for demapping a first subset of the group of CBs to the first subset of subbands based on the first bandwidth and a second subset of the group of CBs to the second subset of subbands based on the second bandwidth. In some examples, each subset of the group of CBs are mapped exclusively to the corresponding subset of subbands.

In some examples, the bandwidth manager 1060 is capable of, configured to, or operable to support a means for demapping each CB of the group of CBs to the first subset of subbands or to the second subset of subbands based on the total bandwidth. In some examples, the bandwidth manager 1060 is capable of, configured to, or operable to support a means for demapping, based on the total bandwidth, on the first bandwidth, and the second bandwidth, a first subset of the group of CBs to the first subset of subbands and a second subset of the group of CBs to the second subset of subbands.

In some examples, the per-subband manager 1040 is capable of, configured to, or operable to support a means for identifying a number of subbands in the set of subbands to demap each CB of the single TB from based on a capability of the receiving wireless device, on a grant-based timeline, or both.

In some examples, the grant-based timeline includes a first time between obtaining the grant and receiving the single TB or on a second time between receiving the single TB and a feedback message transmission associated with reception of the single TB. In some examples, each subband in the set of subbands are associated with a common subcarrier spacing. In some examples, one or more subbands in the set of subbands are associated with a different subcarrier spacing.

In some examples, the per-subband manager 1040 is capable of, configured to, or operable to support a means for demapping each CB in the single TB from one or more subbands in the set of subbands that are associated with a common subcarrier spacing. In some examples, the per-subband manager 1040 is capable of, configured to, or operable to support a means for demapping one or more CBs in the single TB from a subset of subbands associated with the different subcarrier spacing. In some examples, a feedback timeline associated with receiving the single TB is based on a subband having a smallest subcarrier spacing or a subcarrier spacing associated with an absolute largest processing timeline. In some examples, the different parameters of the second set of parameters include different modulation orders for different subbands in the set of subbands.

In some examples, the per-subband manager 1040 is capable of, configured to, or operable to support a means for deinterleaving, in a uniform systemic bit priority mapper, bits of a first CB of the single TB from a first subband associated with a first modulation order and a second CB of the single TB from a second subband associated with a second modulation order. In some examples, the per-subband manager 1040 is capable of, configured to, or operable to support a means for deinterleaving, in a non-uniform systemic bit priority mapper, bits of a first CB of the single TB and a second CB of the single TB from a first subband associated with a first modulation order and from a second subband associated with a second modulation order.

In some examples, the per-subband manager 1040 is capable of, configured to, or operable to support a means for obtaining an indication of an interleaving parameter for the single TB, where the interleaving parameter is based on a capability of the receiving wireless device. In some examples, the per-subband manager 1040 is capable of, configured to, or operable to support a means for demapping modulated symbols of the single TB from spatial layers on a per-subband basis.

Figure 11:
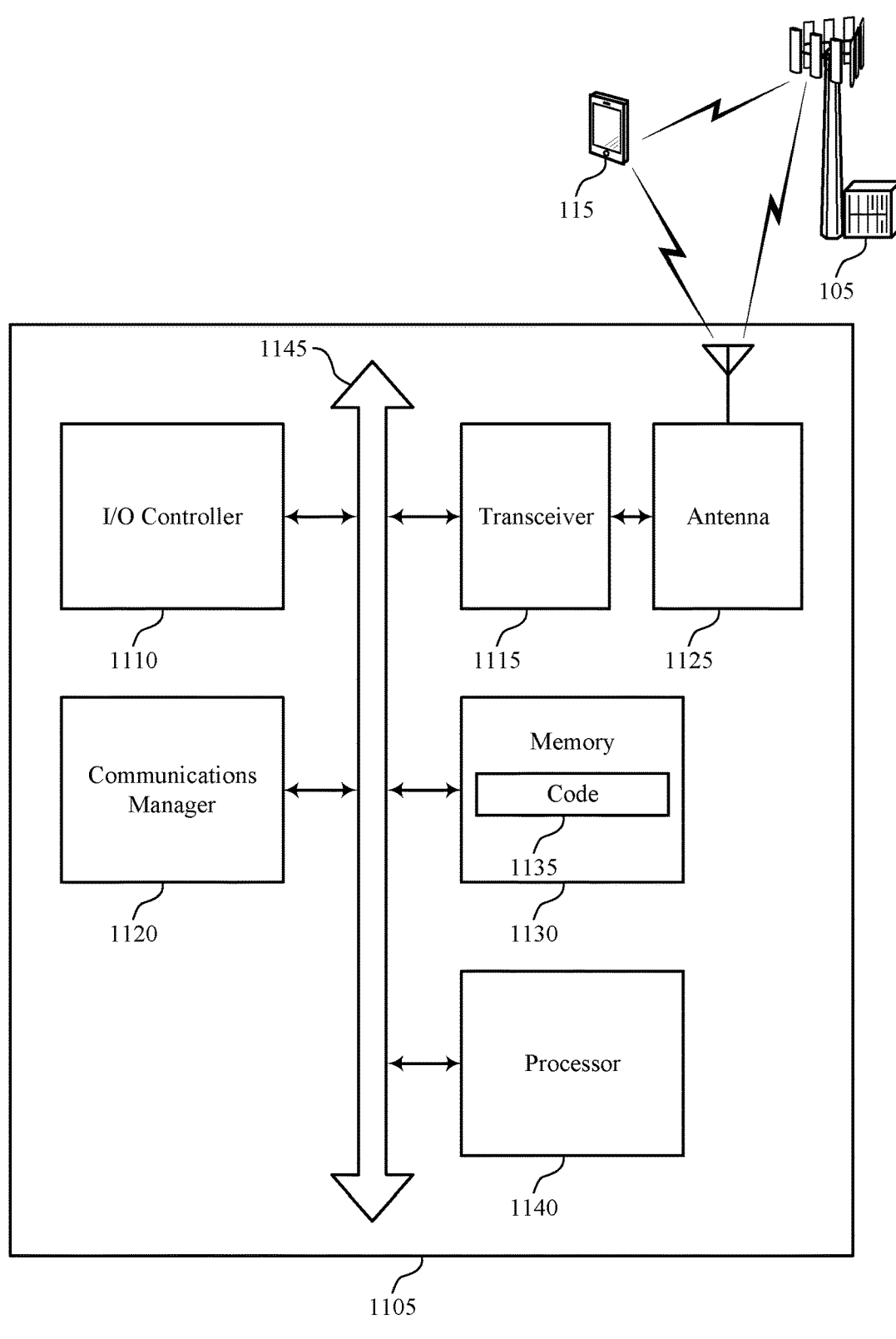
FIG. 11 shows a diagram of a system including a UE that supports physical shared channel design for flexible spectrum integration in accordance with one or more aspects of the present disclosure.

FIG. 11 shows a diagram of a system 1100 including a device 1105 that supports physical shared channel design for flexible spectrum integration in accordance with one or more aspects of the present disclosure. The device 1105 may be an example of or include components of a device 805, a device 905, or a UE 115 as described herein. The device 1105 may communicate (e.g., wirelessly) with one or more other devices (e.g., network entities 105, UEs 115, or a combination thereof). The device 1105 may include components for bi-directional voice and data communications including components for transmitting and receiving communications, such as a communications manager 1120, an input/output (I/O) controller, such as an I/O controller 1110, a transceiver 1115, one or more antennas 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna. However, in some other cases, the device 1105 may have more than one antenna, which may be capable of concurrently transmitting or receiving multiple wireless transmissions. The transceiver 1115 may communicate bi-directionally via the one or more antennas 1125 using wired or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable, or processor-executable code, such as the code 1135. The code 1135 may include instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may include, among other things, a basic I/O system (BIOS) which may control basic hardware or software operation such as the interaction with peripheral components or devices.

The at least one processor 1140 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting physical shared channel design for flexible spectrum integration). For example, the device 1105 or a component of the device 1105 may include at least one processor 1140 and at least one memory 1130 coupled with or to the at least one processor 1140, the at least one processor 1140 and the at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions described herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code 1135 (e.g., processor-executable code) stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The communications manager 1120 is capable of, configured to, or operable to support a means for obtaining a grant via at least one subband of the set of subbands, the grant scheduling communications with a receiving wireless device in the integrated spectrum channel. The communications manager 1120 is capable of, configured to, or operable to support a means for generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The communications manager 1120 is capable of, configured to, or operable to support a means for transmitting the single TB to the receiving wireless device in the integrated spectrum channel according to the grant.

Additionally, or alternatively, the communications manager 1120 may support wireless communications in accordance with examples as disclosed herein. For example, the communications manager 1120 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The communications manager 1120 is capable of, configured to, or operable to support a means for obtaining a grant via at least one subband of the set of subbands, the grant scheduling communications with a transmitting wireless device in the integrated spectrum channel. The communications manager 1120 is capable of, configured to, or operable to support a means for receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

By including or configuring the communications manager 1120 in accordance with examples as described herein, the device 1105 may support techniques for single TB transmission in an integrated spectrum channel. The single TB may be generated on a per-subband basis, in some aspects, that accounts for the non-contiguous nature of the FSI amalgamation of frequency resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of physical shared channel design for flexible spectrum integration as described herein, or the at least one processor 1140 and the at least one memory 1130 may be otherwise configured to, individually or collectively, perform or support such operations.

Figure 12:
FIG. 12 shows a diagram of a system including a network entity that supports physical shared channel design for flexible spectrum integration in accordance with one or more aspects of the present disclosure.

FIG. 12 shows a diagram of a system 1200 including a device 1205 that supports physical shared channel design for flexible spectrum integration in accordance with one or more aspects of the present disclosure. The device 1205 may be an example of or include components of a device 805, a device 905, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-direction-ally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting physical shared channel design for flexible spectrum integration). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network devices 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The communications manager 1220 is capable of, configured to, or operable to support a means for obtaining a grant via at least one subband of the set of subbands, the grant scheduling communications with a receiving wireless device in the integrated spectrum channel. The communications manager 1220 is capable of, configured to, or operable to support a means for generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The communications manager 1220 is capable of, configured to, or operable to support a means for transmitting the single TB to the receiving wireless device in the integrated spectrum channel according to the grant.

Additionally, or alternatively, the communications manager 1220 may support wireless communications in accordance with examples as disclosed herein. For example, the communications manager 1220 is capable of, configured to, or operable to support a means for obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The communications manager 1220 is capable of, configured to, or operable to support a means for obtaining a grant via at least one subband of the set of subbands, the grant scheduling communications with a transmitting wireless device in the integrated spectrum channel. The communications manager 1220 is capable of, configured to, or operable to support a means for receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands.

By including or configuring the communications manager 1220 in accordance with examples as described herein, the device 1205 may support techniques for single TB transmission in an integrated spectrum channel. The single TB may be generated on a per-subband basis, in some aspects, that accounts for the non-contiguous nature of the FSI amalgamation of frequency resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of physical shared channel design for flexible spectrum integration as described herein, or the at least one processor 1235 and the at least one memory 1225 may be otherwise configured to, individually or collectively, perform or support such operations.

FIG. 13 shows a flowchart illustrating a method 1300 that supports physical shared channel design for flexible spectrum integration in accordance with one or more aspects of the present disclosure. The operations of the method 1300 may be implemented by a UE or a network entity or its components as described herein. For example, the operations of the method 1300 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The operations of 1305 may be performed in accordance with examples as disclosed herein. In some examples, aspects of the operations of 1305 may be performed by an integrated spectrum manager 1025 as described with reference to FIG. 10.

At 1310, the method may include obtaining a grant via at least one subband of the set of subbands, the grant scheduling communications with a receiving wireless device in the integrated spectrum channel. The operations of 1310 may be performed in accordance with examples as disclosed herein. In some examples, aspects of the operations of 1310 may be performed by a grant manager 1030 as described with reference to FIG. 10.

At 1315, the method may include generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The operations of 1315 may be performed in accordance with examples as disclosed herein. In some examples, aspects of the operations of 1315 may be performed by a TB manager 1035 as described with reference to FIG. 10.

At 1320, the method may include transmitting the single TB to the receiving wireless device in the integrated spectrum channel according to the grant. The operations of 1320 may be performed in accordance with examples as disclosed herein. In some examples, aspects of the operations of 1320 may be performed by a TB manager 1035 as described with reference to FIG. 10.

Figure 14:
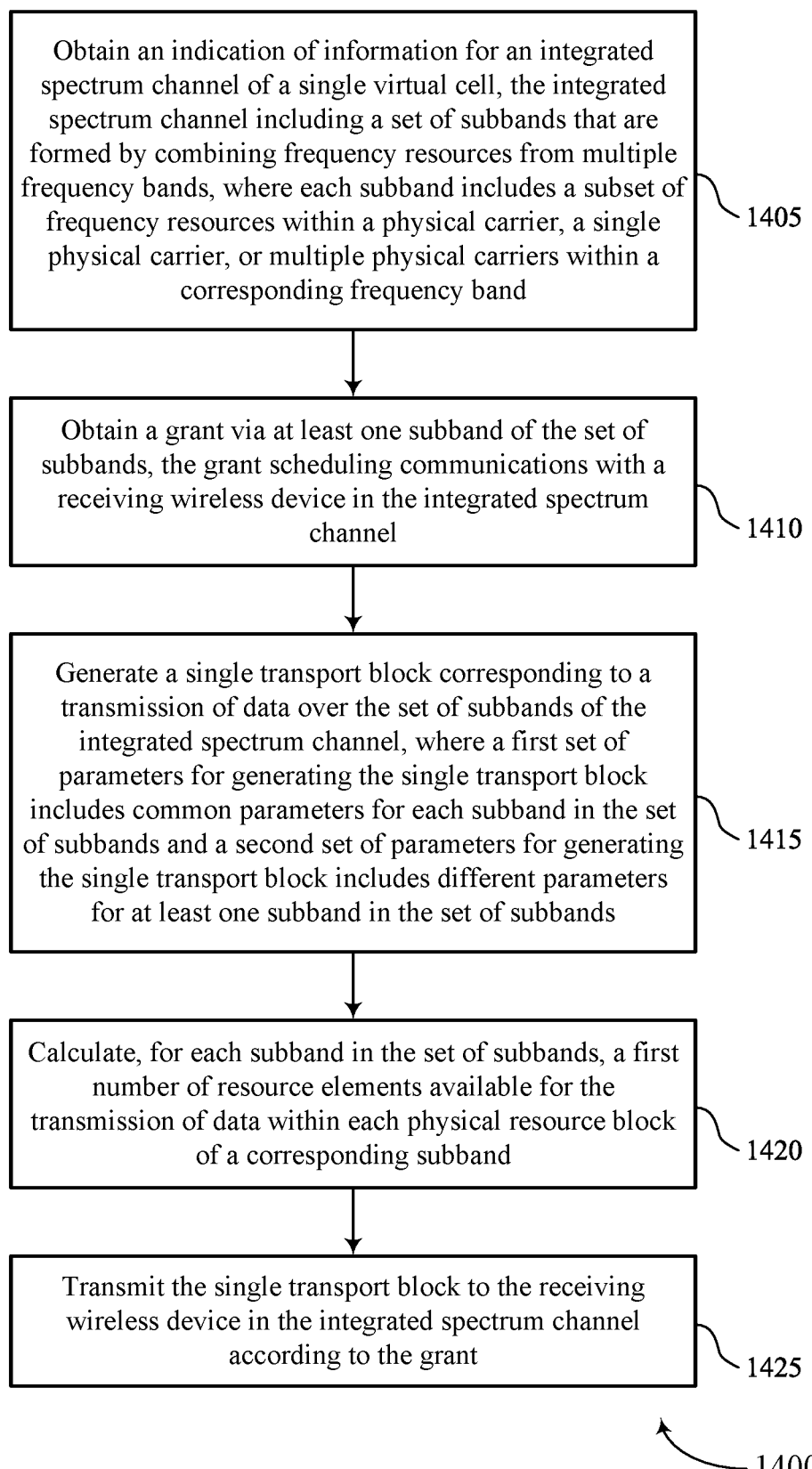

FIG. 14 shows a flowchart illustrating a method 1400 that supports physical shared channel design for flexible spectrum integration in accordance with one or more aspects of the present disclosure. The operations of the method 1400 may be implemented by a UE or a network entity or its components as described herein. For example, the operations of the method 1400 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The operations of 1405 may be performed in accordance with examples as disclosed herein. In some examples, aspects of the operations of 1405 may be performed by an integrated spectrum manager 1025 as described with reference to FIG. 10.

At 1410, the method may include obtaining a grant via at least one subband of the set of subbands, the grant scheduling communications with a receiving wireless device in the integrated spectrum channel. The operations of 1410 may be performed in accordance with examples as disclosed herein. In some examples, aspects of the operations of 1410 may be performed by a grant manager 1030 as described with reference to FIG. 10.

At 1415, the method may include generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The operations of 1415 may be performed in accordance with examples as disclosed herein. In some examples, aspects of the operations of 1415 may be performed by a TB manager 1035 as described with reference to FIG. 10.

At 1420, the method may include calculating, for each subband in the set of subbands, a first number of resource elements available for the transmission of data within each physical resource block of a corresponding subband. The operations of 1420 may be performed in accordance with examples as disclosed herein. In some examples, aspects of the operations of 1420 may be performed by a per-subband manager 1040 as described with reference to FIG. 10.

At 1425, the method may include transmitting the single TB to the receiving wireless device in the integrated spectrum channel according to the grant. The operations of 1425 may be performed in accordance with examples as disclosed herein. In some examples, aspects of the operations of 1425 may be performed by a TB manager 1035 as described with reference to FIG. 10.

FIG. 15 shows a flowchart illustrating a method 1500 that supports physical shared channel design for flexible spectrum integration in accordance with one or more aspects of the present disclosure. The operations of the method 1500 may be implemented by a UE or a network entity or its components as described herein. For example, the operations of the method 1500 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1505, the method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The operations of 1505 may be performed in accordance with examples as disclosed herein. In some examples, aspects of the operations of 1505 may be performed by an integrated spectrum manager 1025 as described with reference to FIG. 10.

At 1510, the method may include obtaining a grant via at least one subband of the set of subbands, the grant scheduling communications with a receiving wireless device in the integrated spectrum channel. The operations of 1510 may be performed in accordance with examples as disclosed herein. In some examples, aspects of the operations of 1510 may be performed by a grant manager 1030 as described with reference to FIG. 10.

At 1515, the method may include generating a single TB corresponding to a transmission of data over the set of subbands of the integrated spectrum channel, where a first set of parameters for generating the single TB includes common parameters for each subband in the set of subbands and a second set of parameters for generating the single TB includes different parameters for at least one subband in the set of subbands. The operations of 1515 may be performed in accordance with examples as disclosed herein. In some examples, aspects of the operations of 1515 may be performed by a TB manager 1035 as described with reference to FIG. 10.

At 1520, the method may include applying limited buffer rate matching by calculating a transport block size of the limited buffer rate matching based on a maximum value of one or more parameters that are configured for different subbands in the set of subbands. The operations of 1520 may be performed in accordance with examples as disclosed herein. In some examples, aspects of the operations of 1520 may be performed by a rate matching manager 1045 as described with reference to FIG. 10.

At 1525, the method may include transmitting the single TB to the receiving wireless device in the integrated spectrum channel according to the grant. The operations of 1525 may be performed in accordance with examples as disclosed herein. In some examples, aspects of the operations of 1525 may be performed by a TB manager 1035 as described with reference to FIG. 10.

FIG. 16 shows a flowchart illustrating a method 1600 that supports physical shared channel design for flexible spectrum integration in accordance with one or more aspects of the present disclosure. The operations of the method 1600 may be implemented by a UE or a network entity or its components as described herein. For example, the operations of the method 1600 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The operations of 1605 may be performed in accordance with examples as disclosed herein. In some examples, aspects of the operations of 1605 may be performed by an integrated spectrum manager 1025 as described with reference to FIG. 10.

At 1610, the method may include obtaining a grant via at least one subband of the set of subbands, the grant scheduling communications with a transmitting wireless device in the integrated spectrum channel. The operations of 1610 may be performed in accordance with examples as disclosed herein. In some examples, aspects of the operations of 1610 may be performed by a grant manager 1030 as described with reference to FIG. 10.

At 1615, the method may include receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands. The operations of 1615 may be performed in accordance with examples as disclosed herein. In some examples, aspects of the operations of 1615 may be performed by a TB manager 1035 as described with reference to FIG. 10.

FIG. 17 shows a flowchart illustrating a method 1700 that supports physical shared channel design for flexible spectrum integration in accordance with one or more aspects of the present disclosure. The operations of the method 1700 may be implemented by a UE or a network entity or its components as described herein. For example, the operations of the method 1700 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method may include obtaining an indication of information for an integrated spectrum channel of a single virtual cell, the integrated spectrum channel including a set of subbands that are formed by combining frequency resources from multiple frequency bands, where each subband includes a subset of frequency resources within a physical carrier, a single physical carrier, or multiple physical carriers within a corresponding frequency band. The operations of 1705 may be performed in accordance with examples as disclosed herein. In some examples, aspects of the operations of 1705 may be performed by an integrated spectrum manager 1025 as described with reference to FIG. 10.

At 1710, the method may include obtaining a grant via at least one subband of the set of subbands, the grant scheduling communications with a transmitting wireless device in the integrated spectrum channel. The operations of 1710 may be performed in accordance with examples as disclosed herein. In some examples, aspects of the operations of 1710 may be performed by a grant manager 1030 as described with reference to FIG. 10.

At 1715, the method may include receiving a single TB from the transmitting wireless device in the integrated spectrum channel according to the grant, where the single TB corresponds to a transmission of data over the set of subbands of the integrated spectrum channel, where a first set of parameters of the single TB includes common parameters for each subband in the set of subbands and a second set of parameters of the single TB includes different parameters for at least one subband in the set of subbands. The operations of 1715 may be performed in accordance with examples as disclosed herein. In some examples, aspects of the operations of 1715 may be performed by a TB manager 1035 as described with reference to FIG. 10.

At 1720, the method may include performing decoding operations on a per-subband basis or on a partial subband basis for information bits of the single TB. The operations of 1720 may be performed in accordance with examples as disclosed herein. In some examples, aspects of the operations of 1720 may be performed by a decoding manager 1065 as described with reference to FIG. 10.

The following provides an overview of aspects of the present disclosure:

Aspect 1: A method for wireless communications at a transmitting wireless device, comprising: obtaining an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band; obtaining a grant via at least one subband of the set of subbands, the grant scheduling communications with a receiving wireless device in the integrated spectrum channel; generating a single TB corresponding to a transmission of data over the set of subbands of the integrated spectrum channel, wherein a first set of parameters for generating the single TB comprises common parameters for each subband in the set of subbands and a second set of parameters for generating the single TB comprises different parameters for at least one subband in the set of subbands; and transmitting the single TB to the receiving wireless device in the integrated spectrum channel according to the grant.

Aspect 2: The method of aspect 1, wherein generating the single TB comprises: calculating, for each subband in the set of subbands, a first number of resource elements available for the transmission of data within each physical resource block of a corresponding subband.

Aspect 3: The method of aspect 2, further comprising: calculating a second number of resource elements available for the transmission of data within each subband based on a number of physical resource blocks within the corresponding subband and the first number of resource elements.

Aspect 4: The method of aspect 3, further comprising: calculating a total number of information bits available for transmission of data for all subbands within the set of subbands based on the first number of resource elements and the second number of resource elements; and selecting a TB size for the single TB based on the total number of information bits available for transmission of data.

Aspect 5: The method of any of aspects 1 through 4, further comprising: applying limited buffer rate matching by calculating a transport block size of the limited buffer rate matching based on a maximum value of one or more parameters that are configured for different subbands in the set of subbands.

Aspect 6: The method of any of aspects 1 through 5, wherein the grant is obtained in a PDCCH CORESET that is limited to a single subband of the set of subbands.

Aspect 7: The method of any of aspects 1 through 6, wherein the grant is obtained in a PDCCH CORESET that is configured in a subset of subbands of the set of subbands, a number of subbands in the subset of subbands is based on a capability of the receiving wireless device.

Aspect 8: The method of any of aspects 1 through 7, wherein generating the single TB comprises: performing symbol mapping of information bits within each subband in the set of subbands based on a physical carrier within the subband, on a frequency band of the subband, or both.

Aspect 9: The method of aspect 8, wherein the different parameters of the second set of parameters comprise a first modulation order and number of layers for a first subset of subbands associated with a first set of link parameters and a second modulation order and number of layers for a second subset of subbands associated with a second set of link parameters.

Aspect 10: The method of any of aspects 1 through 9, wherein each of one or more codeblocks of the single TB are mapped to a single subband within the set of subbands or are mapped across more than one subband within the set of subbands.

Aspect 11: The method of any of aspects 1 through 10, wherein generating the single TB comprises: performing precoding operations on a per-subband basis or on a partial subband basis for information bits of the single TB.

Aspect 12: The method of any of aspects 1 through 11, wherein generating the single TB comprises: identifying a total bandwidth that a group of codeblocks of the single TB is mapped to in the set of subbands, wherein the total bandwidth is based on a first bandwidth of a first subset of subbands and a second bandwidth of a second subset of subbands.

Aspect 13: The method of aspect 12, further comprising: mapping a first subset of the group of codeblocks to the first subset of subbands based on the first bandwidth and a second subset of the group of codeblocks to the second subset of subbands based on the second bandwidth.

Aspect 14: The method of aspect 13, wherein each subset of the group of codeblocks are mapped exclusively to the corresponding subset of subbands.

Aspect 15: The method of any of aspects 12 through 14, further comprising: mapping each codeblock of the group of codeblocks to the first subset of subbands or to the second subset of subbands based on the total bandwidth.

Aspect 16: The method of any of aspects 12 through 15, further comprising: mapping, based on the total bandwidth, on the first bandwidth, and the second bandwidth, a first subset of the group of codeblocks to the first subset of subbands and a second subset of the group of codeblocks to the second subset of subbands.

Aspect 17: The method of any of aspects 1 through 16, wherein generating the single TB comprises: identifying a number of subbands in the set of subbands to map each codeblock of the single TB to based on a capability of the receiving wireless device, on a grant-based timeline, or both.

Aspect 18: The method of aspect 17, wherein the grant-based timeline comprises a first time between obtaining the grant and transmitting the single TB or on a second time between transmitting the single TB and a feedback message transmission associated with transmission of the single TB.

Aspect 19: The method of any of aspects 1 through 18, wherein each subband in the set of subbands are associated with a common subcarrier spacing.

Aspect 20: The method of any of aspects 1 through 19, wherein one or more subbands in the set of subbands are associated with a different subcarrier spacing.

Aspect 21: The method of aspect 20, wherein generating the single TB comprises: mapping each codeblock in the single TB to one or more subbands in the set of subbands that are associated with a common subcarrier spacing.

Aspect 22: The method of any of aspects 20 through 21, wherein generating the single TB comprises: mapping one or more codeblocks in the single TB to a subset of subbands associated with the different subcarrier spacing.

Aspect 23: The method of any of aspects 20 through 22, wherein a feedback timeline associated with transmitting the single TB is based at least in part on a subband having a smallest subcarrier spacing or a subcarrier spacing associated with an absolute largest processing timeline.

Aspect 24: The method of any of aspects 1 through 23, wherein the different parameters of the second set of parameters comprise different modulation orders for different subbands in the set of subbands.

Aspect 25: The method of aspect 24, wherein generating the single TB comprises: interleaving, in a uniform systemic bit priority mapper, bits of a first codeblock of the single TB to a first subband associated with a first modulation order and a second codeblock of the single TB to a second subband associated with a second modulation order.

Aspect 26: The method of any of aspects 24 through 25, wherein generating the single TB comprises: interleaving, in a non-uniform systemic bit priority mapper, bits of a first codeblock of the single TB and a second codeblock of the single TB to a first subband associated with a first modulation order and to a second subband associated with a second modulation order.

Aspect 27: The method of any of aspects 24 through 26, further comprising: obtaining an indication of an interleaving parameter for the single TB, wherein the interleaving parameter is based on a capability of the receiving wireless device.

Aspect 28: The method of any of aspects 24 through 27, further comprising: mapping modulated symbols of the single TB to spatial layers on a per-subband basis.

Aspect 29: A method for wireless communications at a receiving wireless device, comprising: obtaining an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band; obtaining a grant via at least one subband of the set of subbands, the grant scheduling communications with a transmitting wireless device in the integrated spectrum channel; and receiving a single TB from the transmitting wireless device in the integrated spectrum channel according to the grant, wherein the single TB corresponds to a transmission of data over the set of subbands of the integrated spectrum channel, wherein a first set of parameters of the single TB comprises common parameters for each subband in the set of subbands and a second set of parameters of the single TB comprises different parameters for at least one subband in the set of subbands.

Aspect 30: The method of aspect 29, wherein the grant is obtained in a PDCCH CORESET that is limited to a single subband of the set of subbands.

Aspect 31: The method of any of aspects 29 through 30, wherein the grant is obtained in a PDCCH CORESET that is configured in a subset of subbands of the set of subbands, a number of subbands in the subset of subbands is based on a capability of the receiving wireless device.

Aspect 32: The method of any of aspects 29 through 31, further comprising: performing symbol demapping of information bits within each subband in the set of subbands based on a physical carrier within the subband, on a frequency band of the subband, or both.

Aspect 33: The method of aspect 32, wherein the different parameters of the second set of parameters comprise a first modulation order and number of layers for a first subset of subbands associated with a first set of link parameters and a second modulation order and number of layers for a second subset of subbands associated with a second set of link parameters.

Aspect 34: The method of any of aspects 29 through 33, wherein each of one or more codeblocks of the single TB are mapped to a single subband within the set of subbands or are mapped across more than one subband within the set of subbands.

Aspect 35: The method of any of aspects 29 through 34, further comprising: performing decoding operations on a per-subband basis or on a partial subband basis for information bits of the single TB.

Aspect 36: The method of any of aspects 29 through 35, further comprising: identifying a total bandwidth that a group of codeblocks of the single TB is mapped to in the set of subbands, wherein the total bandwidth is based on a first bandwidth of a first subset of subbands and a second bandwidth of a second subset of subbands.

Aspect 37: The method of aspect 36, further comprising: demapping a first subset of the group of codeblocks to the first subset of subbands based on the first bandwidth and a second subset of the group of codeblocks to the second subset of subbands based on the second bandwidth.

Aspect 38: The method of aspect 37, wherein each subset of the group of codeblocks are mapped exclusively to the corresponding subset of subbands.

Aspect 39: The method of any of aspects 36 through 38, further comprising: demapping each codeblock of the group of codeblocks to the first subset of subbands or to the second subset of subbands based on the total bandwidth.

Aspect 40: The method of any of aspects 36 through 39, further comprising: demapping, based on the total bandwidth, on the first bandwidth, and the second bandwidth, a first subset of the group of codeblocks to the first subset of subbands and a second subset of the group of codeblocks to the second subset of subbands.

Aspect 41: The method of any of aspects 29 through 40, further comprising: identifying a number of subbands in the set of subbands to demap each codeblock of the single TB from based on a capability of the receiving wireless device, on a grant-based timeline, or both.

Aspect 42: The method of aspect 41, wherein the grant-based timeline comprises a first time between obtaining the grant and receiving the single TB or on a second time between receiving the single TB and a feedback message transmission associated with reception of the single TB.

Aspect 43: The method of any of aspects 29 through 42, wherein each subband in the set of subbands are associated with a common subcarrier spacing.

Aspect 44: The method of any of aspects 29 through 43, wherein one or more subbands in the set of subbands are associated with a different subcarrier spacing.

Aspect 45: The method of aspect 44, further comprising: demapping each codeblock in the single TB from one or more subbands in the set of subbands that are associated with a common subcarrier spacing.

Aspect 46: The method of any of aspects 44 through 45, further comprising: demapping one or more codeblocks in the single TB from a subset of subbands associated with the different subcarrier spacing.

Aspect 47: The method of any of aspects 44 through 46, wherein a feedback timeline associated with receiving the single TB is based at least in part on a subband having a smallest subcarrier spacing or a subcarrier spacing associated with an absolute largest processing timeline.

Aspect 48: The method of any of aspects 29 through 47, wherein the different parameters of the second set of parameters comprise different modulation orders for different subbands in the set of subbands.

Aspect 49: The method of aspect 48, further comprising: deinterleaving, in a uniform systemic bit priority mapper, bits of a first codeblock of the single TB from a first subband associated with a first modulation order and a second codeblock of the single TB from a second subband associated with a second modulation order.

Aspect 50: The method of any of aspects 48 through 49, further comprising: deinterleaving, in a non-uniform systemic bit priority mapper, bits of a first codeblock of the single TB and a second codeblock of the single TB from a first subband associated with a first modulation order and from a second subband associated with a second modulation order.

Aspect 51: The method of any of aspects 48 through 50, further comprising: obtaining an indication of an interleaving parameter for the single TB, wherein the interleaving parameter is based on a capability of the receiving wireless device.

Aspect 52: The method of any of aspects 48 through 51, further comprising: demapping modulated symbols of the single TB from spatial layers on a per-subband basis.

Aspect 53: A transmitting wireless device for wireless communications, comprising one or more memories storing processor-executable code, and one or more processors coupled with the one or more memories and individually or collectively operable to execute the code to cause the transmitting wireless device to perform a method of any of aspects 1 through 28.

Aspect 54: A transmitting wireless device for wireless communications, comprising at least one means for performing a method of any of aspects 1 through 28.

Aspect 55: A non-transitory computer-readable medium storing code for wireless communications, the code comprising instructions executable by one or more processors to perform a method of any of aspects 1 through 28.

Aspect 56: A receiving wireless device for wireless communications, comprising one or more memories storing processor-executable code, and one or more processors coupled with the one or more memories and individually or collectively operable to execute the code to cause the receiving wireless device to perform a method of any of aspects 29 through 52.

Aspect 57: A receiving wireless device for wireless communications, comprising at least one means for performing a method of any of aspects 29 through 52.

Aspect 58: A non-transitory computer-readable medium storing code for wireless communications, the code comprising instructions executable by one or more processors to perform a method of any of aspects 29 through 52.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A transmitting wireless device, comprising:
one or more memories storing processor-executable code; and
one or more processors coupled with the one or more memories and individually or collectively operable to execute the code to cause the transmitting wireless device to:
obtain an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band;
obtain a grant via at least one subband of the set of subbands, the grant scheduling communications with a receiving wireless device in the integrated spectrum channel;
generate a single transport block corresponding to a transmission of data over the set of subbands of the integrated spectrum channel, wherein a first set of parameters for generating the single transport block comprises common parameters for each subband in the set of subbands and a second set of parameters for generating the single transport block comprises different parameters for at least one subband in the set of subbands; and
transmit the single transport block to the receiving wireless device in the integrated spectrum channel according to the grant.

2. The transmitting wireless device of claim 1, wherein, to generate the single transport block, the one or more processors are individually or collectively operable to execute the code to cause the transmitting wireless device to:
calculate, for each subband in the set of subbands, a first number of resource elements available for the transmission of data within each physical resource block of a corresponding subband.

3. The transmitting wireless device of claim 2, wherein the one or more processors are individually or collectively further operable to execute the code to cause the transmitting wireless device to:

calculate a second number of resource elements available for the transmission of data within each subband based on a number of physical resource blocks within the corresponding subband and the first number of resource elements.

4. The transmitting wireless device of claim 3, wherein the one or more processors are individually or collectively further operable to execute the code to cause the transmitting wireless device to:

calculate a total number of information bits available for transmission of data for all subbands within the set of subbands based on the first number of resource elements and the second number of resource elements; and select a transport block size for the single transport block based on the total number of information bits available for transmission of data.

5. The transmitting wireless device of claim 1, wherein the one or more processors are individually or collectively further operable to execute the code to cause the transmitting wireless device to:

apply limited buffer rate matching by calculating a transport block size of the limited buffer rate matching based on a maximum value of one or more parameters that are configured for different subbands in the set of subbands.

6. The transmitting wireless device of claim 1, wherein the grant is obtained in a physical downlink control channel control resource set that is limited to a single subband of the set of subbands.

7. The transmitting wireless device of claim 1, wherein:

the grant is obtained in a physical downlink control channel control resource set configured in a subset of subbands of the set of subbands, and a number of subbands in the subset of subbands is based on a capability of the receiving wireless device.

8. The transmitting wireless device of claim 1, wherein, to generate the single transport block, the one or more processors are individually or collectively operable to execute the code to cause the transmitting wireless device to:

perform symbol mapping of information bits within each subband in the set of subbands based on a physical carrier within the subband, on a frequency band of the subband, or both.

9. The transmitting wireless device of claim 8, wherein the different parameters of the second set of parameters comprise a first modulation order and number of layers for a first subset of subbands associated with a first set of link parameters and a second modulation order and number of layers for a second subset of subbands associated with a second set of link parameters.

10. The transmitting wireless device of claim 1, wherein each of one or more codeblocks of the single transport block are mapped to a single subband within the set of subbands or are mapped across more than one subband within the set of subbands.

11. The transmitting wireless device of claim 1, wherein, to generate the single transport block, the one or more processors are individually or collectively operable to execute the code to cause the transmitting wireless device to:

perform precoding operations on a per-subband basis or on a partial subband basis for information bits of the single transport block.

12. The transmitting wireless device of claim 1, wherein, to generate the single transport block, the one or more processors are individually or collectively operable to execute the code to cause the transmitting wireless device to:

identify a total bandwidth that a group of codeblocks of the single transport block is mapped to in the set of subbands, wherein the total bandwidth is based on a first bandwidth of a first subset of subbands and a second bandwidth of a second subset of subbands.

13. The transmitting wireless device of claim 12, wherein the one or more processors are individually or collectively further operable to execute the code to cause the transmitting wireless device to:

map a first subset of the group of codeblocks to the first subset of subbands based on the first bandwidth and a second subset of the group of codeblocks to the second subset of subbands based on the second bandwidth.

14. The transmitting wireless device of claim 13, wherein each subset of the group of codeblocks are mapped exclusively to the corresponding subset of subbands.

15. The transmitting wireless device of claim 12, wherein the one or more processors are individually or collectively further operable to execute the code to cause the transmitting wireless device to:

map each codeblock of the group of codeblocks to the first subset of subbands or to the second subset of subbands based on the total bandwidth.

16. The transmitting wireless device of claim 12, wherein the one or more processors are individually or collectively further operable to execute the code to cause the transmitting wireless device to:

mapping, base on the total bandwidth, on the first bandwidth, and the second bandwidth, a first subset of the group of codeblocks to the first subset of subbands and a second subset of the group of codeblocks to the second subset of subbands.

17. The transmitting wireless device of claim 1, wherein, to generate the single transport block, the one or more processors are individually or collectively operable to execute the code to cause the transmitting wireless device to:

identify a number of subbands in the set of subbands to map each codeblock of the single transport block to based on a capability of the receiving wireless device, on a grant-based timeline, or both.

18. The transmitting wireless device of claim 17, wherein the grant-based timeline comprises a first time between obtaining the grant and transmitting the single transport block or on a second time between transmitting the single transport block and a feedback message transmission associated with transmission of the single transport block.

19. The transmitting wireless device of claim 1, wherein each subband in the set of subbands are associated with a common subcarrier spacing.

20. The transmitting wireless device of claim 1, wherein one or more subbands in the set of subbands are associated with a different subcarrier spacing.

21. The transmitting wireless device of claim 20, wherein, to generate the single transport block, the one or more processors are individually or collectively operable to execute the code to cause the transmitting wireless device to:

map each codeblock in the single transport block to one or more subbands in the set of subbands that are associated with a common subcarrier spacing.

22. The transmitting wireless device of claim 20, wherein, to generate the single transport block, the one or more processors are individually or collectively operable to execute the code to cause the transmitting wireless device to:

mapping one or more codeblocks in the single transport block to a subset of subbands associate with the different subcarrier spacing.

23. The transmitting wireless device of claim 20, wherein a feedback timeline associated with transmitting the single transport block is based at least in part on a subband having a smallest subcarrier spacing or a subcarrier spacing associated with an absolute largest processing timeline.

24. The transmitting wireless device of claim 1, wherein the different parameters of the second set of parameters comprise different modulation orders for different subbands in the set of subbands.

25. The transmitting wireless device of claim 24, wherein, to generate the single transport block, the one or more processors are individually or collectively operable to execute the code to cause the transmitting wireless device to:

interleave, in a uniform systemic bit priority mapper, bits of a first codeblock of the single transport block to a first subband associated with a first modulation order and a second codeblock of the single transport block to a second subband associated with a second modulation order.

26. The transmitting wireless device of claim 24, wherein, to generate the single transport block, the one or more processors are individually or collectively operable to execute the code to cause the transmitting wireless device to:

interleave, in a non-uniform systemic bit priority mapper, bits of a first codeblock of the single transport block and a second codeblock of the single transport block to a first subband associated with a first modulation order and to a second subband associated with a second modulation order.

27. The transmitting wireless device of claim 24, wherein the one or more processors are individually or collectively further operable to execute the code to cause the transmitting wireless device to:

obtain an indication of an interleaving parameter for the single transport block, wherein the interleaving parameter is based on a capability of the receiving wireless device.

28. A receiving wireless device, comprising:

one or more memories storing processor-executable code; and one or more processors coupled with the one or more memories and individually or collectively operable to execute the code to cause the receiving wireless device to:

obtain an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band;

obtain a grant via at least one subband of the set of subbands, the grant scheduling communications with a transmitting wireless device in the integrated spectrum channel; and receive a single transport block from the transmitting wireless device in the integrated spectrum channel according to the grant, wherein the single transport block corresponds to a transmission of data over the set of subbands of the integrated spectrum channel, wherein a first set of parameters of the single transport block comprises common parameters for each subband in the set of subbands and a second set of parameters of the single transport block comprises different parameters for at least one subband in the set of subbands.

29. A method for wireless communications at a transmitting wireless device, comprising:

obtaining an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band;

obtaining a grant via at least one subband of the set of subbands, the grant scheduling communications with a receiving wireless device in the integrated spectrum channel;

generating a single transport block corresponding to a transmission of data over the set of subbands of the integrated spectrum channel, wherein a first set of parameters for generating the single transport block comprises common parameters for each subband in the set of subbands and a second set of parameters for generating the single transport block comprises different parameters for at least one subband in the set of subbands; and transmitting the single transport block to the receiving wireless device in the integrated spectrum channel according to the grant.

30. A method for wireless communications at a receiving wireless device, comprising:

obtaining an indication of information for an integrated spectrum channel of a single virtual cell, the integrated spectrum channel comprising a set of subbands that are formed by combining frequency resources from multiple frequency bands, wherein each subband includes a subset of frequency resources within a physical carrier, a single physical carrier, or multiple physical carriers within a corresponding frequency band;

obtaining a grant via at least one subband of the set of subbands, the grant scheduling communications with a transmitting wireless device in the integrated spectrum channel; and receiving a single transport block from the transmitting wireless device in the integrated spectrum channel according to the grant, wherein the single transport block corresponds to a transmission of data over the set of subbands of the integrated spectrum channel, wherein a first set of parameters of the single transport block comprises common parameters for each subband in the set of subbands and a second set of parameters of the single transport block comprises different parameters for at least one subband in the set of subbands.

* * * * *